United States Patent
Kanda et al.

(10) Patent No.: US 7,117,314 B2
(45) Date of Patent: *Oct. 3, 2006

(54) STORAGE DEVICE AND METHOD FOR DATA SHARING

(75) Inventors: Motohiro Kanda, Yokohama (JP); Akira Yamamoto, Sagamihara (JP); Toshio Nakano, Chigasaki (JP); Minoru Yoshida, Odawara (JP)

(73) Assignee: Hitachi, Ltd., Tokyo (JP)

( * ) Notice: Subject to any disclaimer, the term of this patent is extended or adjusted under 35 U.S.C. 154(b) by 214 days.

This patent is subject to a terminal disclaimer.

(21) Appl. No.: 10/822,702

(22) Filed: Apr. 13, 2004

(65) Prior Publication Data

US 2004/0193794 A1    Sep. 30, 2004

Related U.S. Application Data

(63) Continuation of application No. 10/379,571, filed on Mar. 6, 2003, now Pat. No. 6,748,500, which is a continuation of application No. 09/873,359, filed on Jun. 5, 2001, now Pat. No. 6,598,129, which is a continuation of application No. 09/467,211, filed on Dec. 20, 1999, now Pat. No. 6,275,910, which is a continuation of application No. 09/315,819, filed on May 21, 1999, now Pat. No. 6,041,391, which is a continuation of application No. 09/256,472, filed on Feb. 23, 1999, now Pat. No. 5,983,317, which is a continuation of application No. 08/774,447, filed on Dec. 30, 1996, now abandoned.

(30) Foreign Application Priority Data

Jan. 19, 1996   (JP)   .................................... 8-007136

(51) Int. Cl.
 *G06F 12/00* (2006.01)

(52) U.S. Cl. ...................... 711/147; 711/149; 711/112; 710/74

(58) Field of Classification Search ................ 711/147, 711/149, 112; 710/74
See application file for complete search history.

(56) References Cited

U.S. PATENT DOCUMENTS 5,206,939 A    4/1993   Yanai et al. ................... 711/4

(Continued)

FOREIGN PATENT DOCUMENTS

EP          0559142        9/1993

(Continued)

OTHER PUBLICATIONS

G. H. Edstrom, et al "Interconnector for Diverse Types of Programmed Apparatus" IBM Technical Disclosure Bulletin, IBM Corp., vol. 18, No. 8, Jan. 1976, pp. 2415-2417.
US 5,907,858, 05/1999, Kanda et al. (withdrawn)

*Primary Examiner*—Hiep T. Nguyen
(74) *Attorney, Agent, or Firm*—Mattingly, Stanger, Malur & Brundidge, P.C.

(57) ABSTRACT

In a computer system including a disk subsystem having channel interface compatible to a count-key-data format and a SCSI interface compatible to a fixed length data format, the disk subsystem is connected to a CPU controlled by an open system operating system through the SCSI interface, and connected to an other CPU controlled by a main frame operating system through the channel interface. The CPU is provided with a CKD record access library and a VSAM access library which accesses in a FBA format the VSAM record stored by the other CPU in a CKD format in the disk subsystem and allows the access by an application program of the CPU as a VSAM record based on VSAM control information.

9 Claims, 18 Drawing Sheets

U.S. PATENT DOCUMENTS

| | | | |
|---|---|---|---|
| 5,293,618 A | 3/1994 | Tandai et al. | 711/130 |
| 5,388,013 A | 2/1995 | Nakamura | 360/48 |
| 5,463,754 A | 10/1995 | Beausoleil et al. | 709/213 |
| 5,471,615 A | 11/1995 | Amatsu et al. | 709/202 |
| 5,530,845 A | 6/1996 | Hiatt et al. | 395/500.48 |
| 5,535,372 A | 7/1996 | Benhase | 395/500 |
| 5,581,743 A | 12/1996 | Burton et al. | 395/500.47 |
| 5,649,153 A | 7/1997 | McNutt et al. | 711/112 |
| 5,664,144 A | 9/1997 | Yanai | 711/113 |
| 5,724,542 A | 3/1998 | Taroda et al. | 711/113 |
| 5,758,125 A | 5/1998 | Misinai | 395/500 |
| 5,765,200 A | 6/1998 | McIllvain et al. | 711/170 |
| 5,835,939 A | 11/1998 | Kurokawa | 711/113 |
| 5,857,213 A | 1/1999 | Benhase | 711/112 |
| 5,860,087 A | 1/1999 | Maeda et al. | 711/112 |
| 5,862,363 A | 1/1999 | Taroda et al. | 395/500 |
| 5,890,206 A | 3/1999 | Koike | 711/112 |
| 5,901,327 A | 5/1999 | Ofek | 711/100 |
| 5,920,893 A | 7/1999 | Nakayama et al. | 711/147 |
| 5,983,317 A | 11/1999 | Kanda et al. | |
| 6,041,391 A | 3/2000 | Kanda et al. | |
| 6,145,006 A | 11/2000 | Vishlitsky et al. | 709/229 |
| 6,233,660 B1 | 5/2001 | Vishlitsky et al. | 703/24 |
| 6,275,910 B1 | 8/2001 | Kanda et al. | |
| 6,304,940 B1 | 10/2001 | Beardsley | 711/112 |
| 6,598,129 B1 | 7/2003 | Kanda et al. | |

FOREIGN PATENT DOCUMENTS

| | | |
|---|---|---|
| JP | 1309117 | 12/1989 |
| JP | 4223518 | 8/1992 |
| JP | 5250242 | 9/1993 |
| JP | 7044324 | 2/1995 |
| JP | 7121415 | 5/1995 |
| JP | 71911897 | 7/1995 |
| JP | 8006732 | 1/1996 |
| JP | 8166919 | 6/1996 |
| WO | 9109364 | 6/1991 |
| WO | 9323811 | 11/1993 | ized in accordance with the present invention, a disk subsystem connected to the first and second computers. The disk subsystem comprises a first interface
STORAGE DEVICE AND METHOD FOR DATA SHARING The present application is a continuation of application Ser. No. 10/379,571, filed Mar. 6, 2003 now U.S. Pat. No. 6,748,500; which is a continuation of application Ser. No. 09/873,359, filed Jun. 5, 2001, now U.S. Pat. No. 6,598,129; which is a continuation of application Ser. No. 09/467,211, filed Dec. 20, 1999, now U.S. Pat. No. 6,275,910; which is a continuation of application Ser. No. 09/315,819, filed May 21, 1999, now U.S. Pat. No. 6,041,391; which is a continuation of application Ser. No. 09/256,472, filed Feb. 23, 1999, now U.S. Pat. No. 5,983,317; which is a continuation of application Ser. No. 08/774,447, filed Dec. 30, 1996, now abandoned, the contents of which are incorporated herein by reference.

BACKGROUND OF THE INVENTION

The present invention relates to a computer system, and more particularly to a computer system provided with a storage device subsystem having both an interface compatible to a count-key data format and an interface compatible to a fixed length block format.

So-called down sizing which conducts applications which have heretofore been conducted in a main frame by using a so-called open system such as a personal computer or a workstation has recently been becoming popular. A large volume of information is stored in the main frame by the applications conducted heretofore and there is a big demand to access the information stored in the main frame from the open system. In the past, as for the sharing or file transformation of files between different operating systems, a technique to access a file in the MS-DOS operating system which is a personal computer operating system of the Microsoft Inc., USA, from the UNIX operating system on a workstation (operating system licensed by the X/Open Company Ltd., has been known.

Generally, in a computer system, information is stored in a storage device such as a disk storage. The main frame traditionally desired to use the disk access in the count-key-data format while the open system desires to use the disk access in the fixed length block format. Thus, the information used on the disk used in the main frame cannot be directly used from the open system. As techniques to access the information on the disk used in the main frame from the open system, a distributed database and a technique to utilize a file transfer have been known but such techniques have drawbacks in that they impose a heavy workload to a network and need modification of existing application programs.

SUMMARY OF THE INVENTION

It is an object of the present invention to allow the direct access to information stored in a disk storage by a computer which conduct the disk access in accordance with a count-key-data format from a computer provided with an interface which conducts the disk access in accordance with a fixed length block format.

A computer system in accordance with the present invention comprises a first computer (main frame) which conducts the disk access in accordance with the count-key-data format, a second computer (open system) which conducts the disk access in accordance with the fixed length block format and a disk subsystem connected to the first and second computers. The disk subsystem comprises a first interface which is connected to the first computer and compatible to the count-key-data format, a second interface which is connected to the second computer and compatible to the fixed length data format and means for reading the information from the disk storage in accordance with a fixed length data format address received from the second interface and transferring the read information to the second computer in a fixed length data format block unit through the second interface. The second computer comprises means for accepting a disk access request compatible to the count-key-data format issued from an application program and converting the count-key-data format address to a fixed length data format address, means for accessing the disk subsystem by using the converted fixed length data format address and means for extracting information designated by the access request from the block-by-block information transferred from the disk subsystem.

DESCRIPTION OF THE PREFERRED EMBODIMENTS (1) First Embodiment

Figure 1:
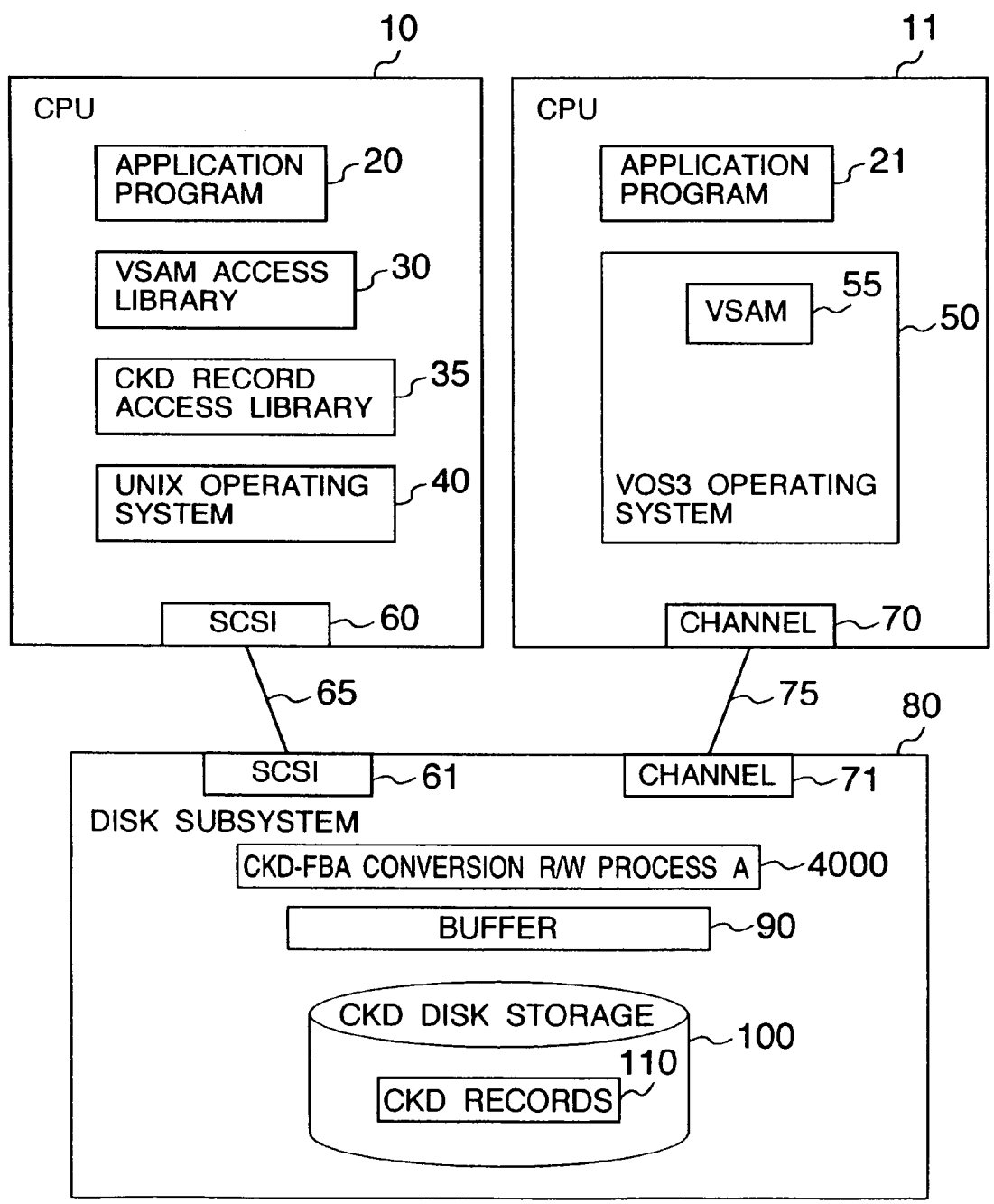
FIG. 1 shows a configuration of a main portion of a computer system in accordance with a first embodiment of the present invention.

FIG. 1 shows a configuration of a main portion of a computer system in accordance with one embodiment of the present invention. In the present embodiment, the computer system comprises two computers CPUs 10 and 11 and a disk subsystem 80 connected to the CPUs 10 and 11.

The CPU 10 is controlled by an UNIX operating system 40 which is widely used in an open system as an operating system and has a SCSI (Small Computer System Interface) interface 60 compatible to the fixed length data format (hereinafter referred to as an FBA (Fixed Block Architecture) format) as an interface with the disk subsystem 80. On the other hand, the CPU 11 is controlled by a conventional general purpose large scale computer operating system (in the present embodiment, the Hitachi VOS3 (Virtual Storage Operating System 3) and has a channel interface 70 compatible to the count-key-data format (hereinafter referred to as a CKD format) as an interface with the disk subsystem 80. The disk subsystem 80 comprises a SCSI interface 61 connected to the CPU 10 and a channel interface 71 connected to the CPU 11. The SCSI interface 61 of the CPU 10 and the SCSI interface 80 of the disk subsystem 80 are connected by a SCSI bus 65. The channel interface 70 of the CPU 11 and the channel interface 71 of the disk subsystem 80 are connected by a channel cable 75. The SCSI interfaces 60 and 61 may be replaced by any interface which is compatible to the fixed length data format. Similarly, the channel interfaces 70 and 71 may be replaced by any interface which is compatible to the count-key-data format. Further, the UNIX operating system 40 may be any operating system which supports the SCSI interface or the VOS3 operating system 50 may be any operating system which supports the channel interface.

The disk subsystem 80 comprises a CKD disk storage 100 which stores files accessed by the CPU 10 and 11 (in the present embodiment, VSAM ESDS (Virtual Storage Access method Entry-Sequenced Dataset) in a CKD format record (hereinafter referred to as a CKD record) 110 and a buffer 90 which holds a partial 'copy of the data stored* in the CKD disk storage 100. Of course, the present invention can be applied to any other datasets having other dataset organizations, for example, SAM (sequential access method) datasets. The disk subsystem 80 provides the access to a record having a cylinder number, a head number and a record number designated which is compatible to the CKD format through the channel interface 71. Hereinafter, the record address identified by the cylinder number, the head number and the record number is referred to as a CCHHR. A track address identified by the cylinder number and the head number is referred to as a CCHH. The disk subsystem 80 further provides the access in accordance with the FBA format through the SCSI interface 61 using CKD-FBA record format conversion R/W process A 4000. CKD-FBA record format conversion R/W process A 4000 accepts a FBA record through the SCSI interface 61, calculates the CCHHR where the record will be stored, converts the record format from FBA to CKD and eventually stores the CKD record, and vice versa. In this case, a block length is of 512-byte length and an LBA (Logical Block Address) 0 corresponds to cylinder 0, head 0 and record 1. The addressing method of the CKD record stored in the disk subsystem in accordance with the FBA format and the accessing thereto will be described later. The data stored in the CKD disk storage 100 is identified by a cylinder number in which the data is stored, a head number and a byte offset from the beginning of the track. The cylinder number and the head number of the CKD disk storage 100 in which the data is stored are not necessarily identical to the cylinder number and the head number designated when the data is accessed from the CPU 11 through the channel interface 71 but in the present embodiment, they are assumed to be identical for the sake of convenience of description. It is assumed that the CXD disk storage 100 can store up to 64K bytes of data per track. A data capacity which can be stored in one track is referred to as a track capacity and a product of the track capacity and the number of tracks per cylinder is referred to as a cylinder capacity. The buffer 90 has as large size as the track capacity. While only one CKD disk storage 180 owned by the disk subsystem 80 is shown in FIG. 1, one subsystem may have a plurality of disk storages.

Application programs 20 and 21 run in the CPU 10 and the CPU 11, respectively. The application programs 20 and 21 access a VSAM ESDS on the disk subsystem 80 through the UNIX operating system 40 or the VOS3 operating system 50. The VOS3 operating system 50 on the CPU 11 includes a VSAM 55. The VSAM 55 allows the access to the data stored in the disk subsystem 80 from the application program 21 as a VSAM dataset record. On the other hand, the CPU 10 is provided with a VSAM access library 30 and a CKD record access library 35. The CKD record access library 35 is issued by the VSAM access library 30. A CKD record access request is converted to an access request in the FBA format and it is supplied to the UNIX operating system 40, and a result thereof is converted to the CKD format and returned to the VSAM access library 30. The VSAM access library 30 refers a data structure for controlling the VSAM stored in the disk subsystem 80 and allows the access to the data stored in the disk subsystem 80 from the application program 20 as a VSAM dataset record.

Figure 2:
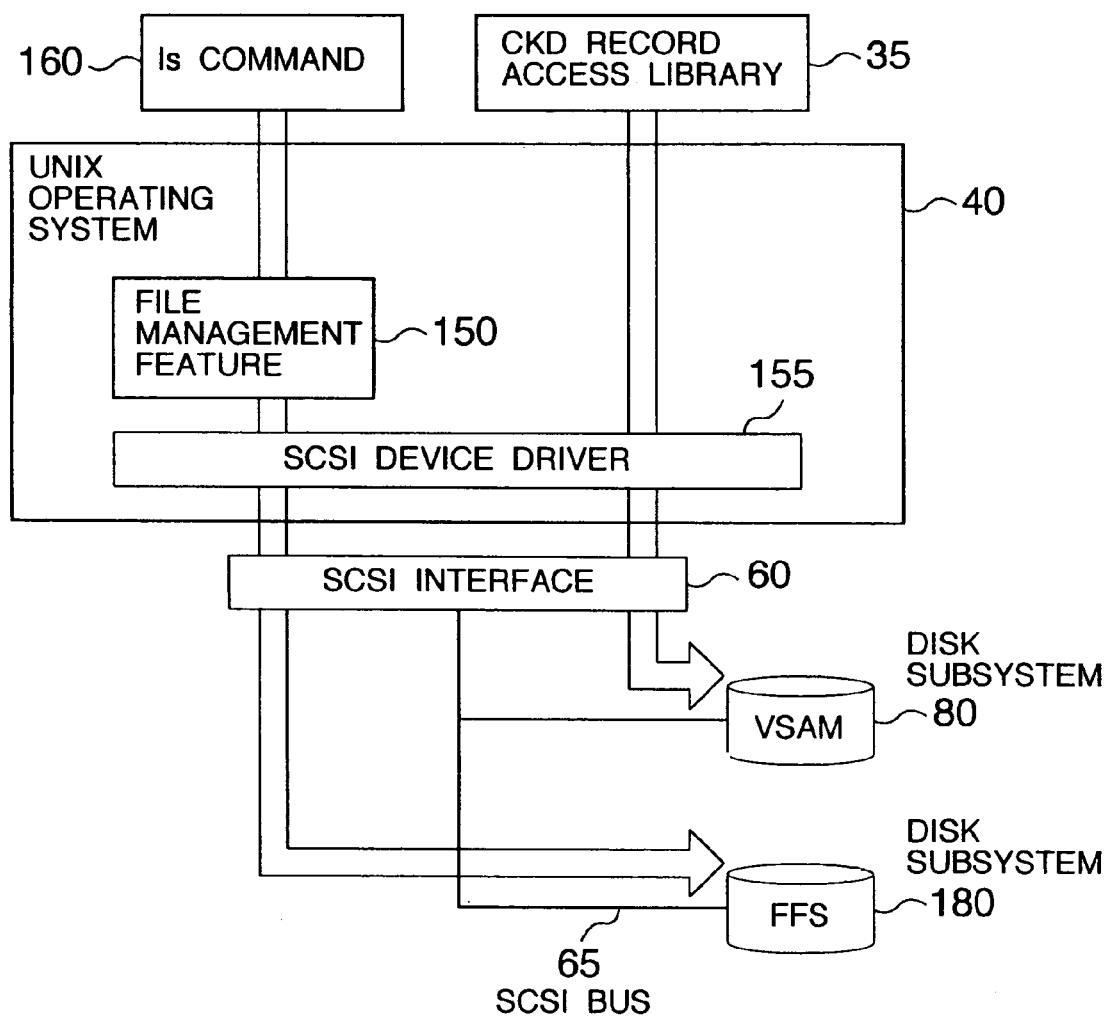
FIG. 2 shows a configuration of a main portion of a UNIX operating system in accordance with a first embodiment of the present invention.

FIG. 2 shows a configuration of a main portion of the UNIX operating system 40. The UNIX operating system 40 includes a file management feature 150 and a SCSI device driver 155. In FIG. 2, those features which are not relevant to the disk access process in the present embodiment such as a memory management feature and a process management feature are omitted. The SCSI device driver 155 controls the SCSI interface 60 and accesses the disk subsystems 80 and 180. The disk subsystem 180 stores FFS (Berkley Fast File System) files which are in a file system format supported by the file management feature 150 of the UNIX operating system 40. The disk subsystem 180 may be connected to the CPU 10 through the SCSI bus 65 together with the disk subsystem 80 which stores the VSAM dataset, although not shown in FIG. 1 but as shown in FIG. 2. It is assumed that the file management feature 150 of the UNIX operating system 40 does not support the access to the VSAM dataset.

An Is command 160 is a command to indicate a list of files present in a designated directory. The UNIX operating system 40 processes a device access request of the Is command 160 issued by designating a directory in the FSS included in the disk subsystem 180 by the file management feature 150 and the SCSI device driver 155 and accesses the disk subsystem 180. On the other hand, when the UNIX operating system 40 receives the disk access request of the CKD record access library 35, it processes it by only the SCSI device driver without the intervention of the file management feature and accesses the disk subsystem 80. In this case, attribute information and physical storage location information included in disk subsystem 80 are not supplied from the UNIX operating system 40 to the CKD record access library 35. The CKD record access library 35 can see the entire disk subsystem 80 as only one file. Such an access method is referred to as a raw IO. The UNIX operating system 40 identifies the two disk access requests by a file name. When a character special file name is designated as the access file name, the access by the raw IO is conducted, and when other conventional file name is designated, the access is conducted through the file management feature 150. As the character special file name, a file name/dev/rsdlc may be used.

In the present embodiment, the VSAM access library 30 and the CKD record access library 35 are provided externally of the UNIX operating system 40 in order to support the access to the VSAM dataset although the access to the VSAM dataset may be supported by the file management feature 150 of the UNIX operating system 40. In this case, the VSAM access library 30 and the CKD record access library 35 are loaded as parts of the UNIX operating system.

Figure 3:
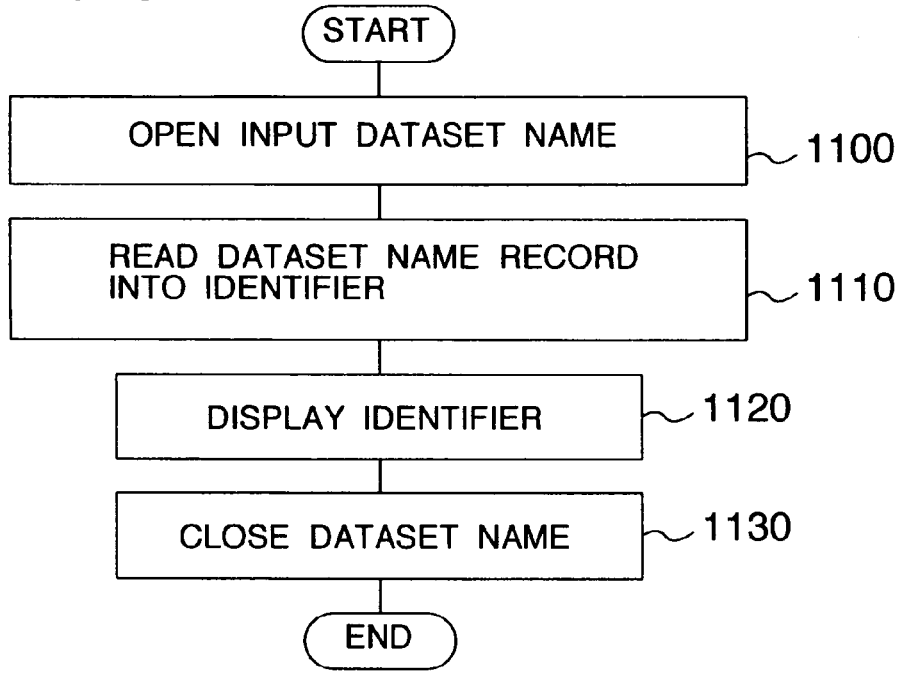
FIG. 3 shows flow chart of a process of an application program in accordance with the first embodiment of the present invention.

FIG. 3 shows a flow chart of a process which is conducted when the application program 20 accesses the VSAM ESDS stored in the disk subsystem 80. The application program may be described in a program language such as COBOL. It is assumed here that the process opens one of the VSAM ESDSs stored in the disk subsystem 80, reads the first one of the records of the dataset, displays it and closes the dataset to terminate the process.

In a step 1100, the application program first opens the dataset. In the COBOL description format, it is "OPEN INPUT dataset name" which indicates to open the designated dataset for read-only. The VSAM access library 30 is called thereby. Then, in a step 1110, the VSAM record is read. In the COBOL description format, it is "READ dataset name RECORD INTO identifier". It indicates to read one of the VSAM records from the designated dataset and enter the record into a variable identified by the identifier of the application program 20. The VSAM access library 30 is called thereby. In a step 1120, the VSAM record read in the step 1110 is displayed on the console. In a step 1130, the dataset is closed. In the COBOL description format, it is "CLOSE dataset name". The VSAM access library 30 is called thereby.

The process conducted in the VSAM access library 30 in the steps 1100, 1110 and 1130 is now explained.

Figure 4:
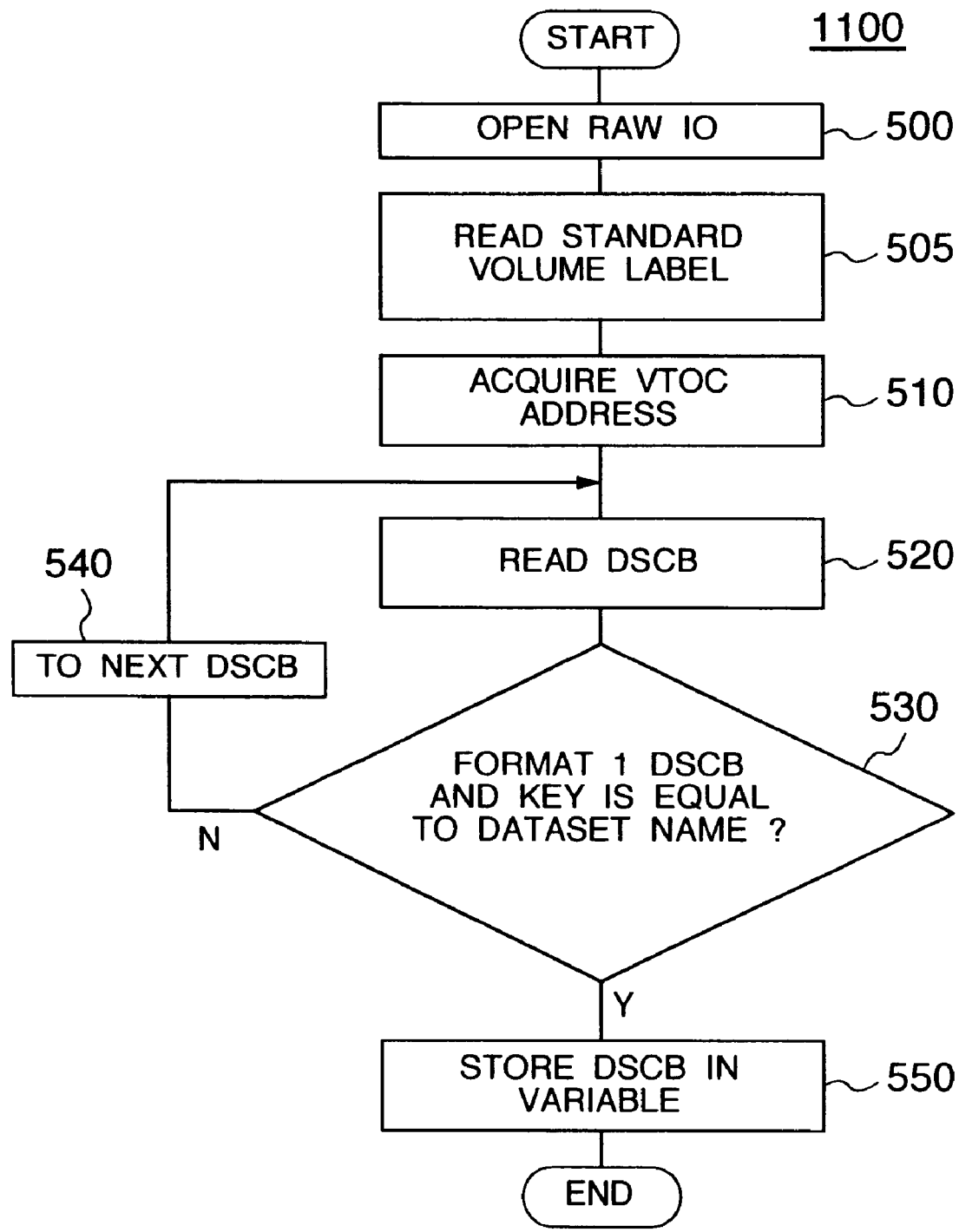
FIG. 4 shows a flow chart of a VSAM OPEN process in accordance with the first embodiment of the present invention.

FIG. 4 shows a flow chart of the VSAM ESDS open process which is conducted by the VSAM access library 30 in the step 1100. In a step 500, the VSAM access library 30 opens the raw IO feature of the UNIX operating system 40. More precisely, it opens a character special file corresponding to the disk subsystem 80. In the present embodiment, it is assumed that all VSAM ESDSs are present on the disk subsystem 80 but it is possible that a plurality of disk storages are connected to the CPU 10 and in such a case, a particular disk in which it is present is determined based on the designated dataset name. In a step S510, the VSAM access library 30 reads a standard volume label from the disk subsystem 80 by utilizing the function of the CKD record access library. The standard volume label is written at a specific location on the CKD disk storage 100 and includes a VTOC (Volume Table of Contents) address, that is, a VTOC CCHHR. The standard volume label is read by designating a specific CCHHR and calling a CKD record read process to be described later. One VTOC is prepared for each disk storage and has management information of all datasets included in that disk storage. The VTOC may be a set of records of a 44-byte key field and 96-byte data field. Each record is referred to as DSCB (Dataset Control Block). The DSCB has various formats and in a format 1 DSCB, the key field includes a dataset name and the data field includes an attribute of the dataset Identified by the dataset name and information on a physical storage location assigned to the dataset. The physical storage location to which the dataset is assigned is called an extent. The extent is identified by the cylinder number and the track number which it occupies.

In a step 520, the VSAM access library 30 reads one of the records of the VTOC by using the feature of the CKD record access library 35. In a step 530, whether the read VTOC record is in the format 1 DSCB or not and whether the key field is equal to the dataset name designated by the application program or not are determined. If the conditions are met, the process proceeds to a step 550. Otherwise, the process proceeds to a step 540. In the step 550, if the condition is met, the DSCB is copied to a local variable of the VSAM access library 30 and the open process is terminated. On the other hand, in the process 540, the record address is advanced to be ready to read the next DSCB and the process returns to the step 520.

Figure 5:
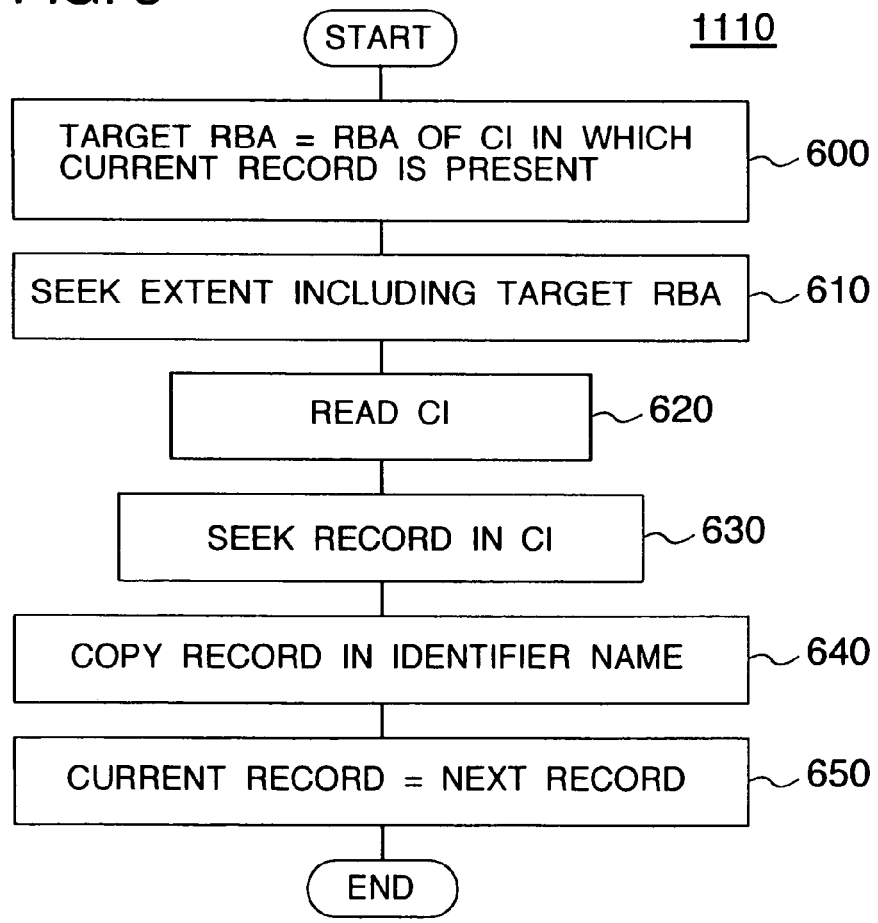
FIG. 5 shows a flow chart of a VSAM READ process in accordance with the first embodiment of the present invention.

FIG. 5 shows a flow chart of a VSAM ESDS read process conducted in the step 1110 by the VSAM access library 30. All VSAM record included in the VSAM ESDS are ordered in the sequence of the preparation thereof. The VSAM access library 30 always stores the storage location of the VSAM record which is currently processed (hereinafter referred to as a current record). The current record is set as the first VSAM record when the dataset is opened. When one VSAM record is read, the current record is changed to the next VSAM record. In the VSAM, a unit of transfer of the disk storage is called a CI (Control Interval). The CI includes the VSAM record as well as management information of an unused space in the CI. The VSAM access library 30 identifies the VSAM record by a RBA (Relative Byte Address) in which it is included and a serial number of the VSAM record in the CI.

In a step 600 of the VSAM read process, the VSAM access library 30 first sets a target RBA to the RBA of the CI which includes the current record. Then, in a step 610, it searches an extent which includes the target RBA. Specifically, it seeks the CCHHR in which the data having an offset in the dataset is stored based on the offset. This process is explained for a read process immediately following the opening of the VSAM ESDS. It is assumed that the current record is included in the first CI of the VSAM ESDS and the RPA of the CI thereof is 0. The format 1 DSCB has an array of extent information and a start CCHH and an end CCHH of the extent are registered for each extent. The array of the extent information is arranged in an ascending order of the corresponding RBA. In the present example, since the target RBA is 0, it is clearly included in the first record of the first extent. As a result, it is determined that the target CCHH is the start CCHH indicated by the first extent information recorded in the, format 1 DSCB. It is also seen that since user data cannot be stored in the record 0, R is 1.

In a step 620, the CCHHR determined in the step 610 is designated to call the CKD record read process. When the CI comprises a plurality of CKD records, the same number of CKD record read processes are called. In a step 630, the control information in the CI is referred to seek the target VSAM record in the CI. It is one which has the serial number of the current record. Then, in a step 640, the VSAM record is copied to the identifier which is a variable of the application program 20. Finally, in a step 650, the current record is set to the next VSAM record and the VSAM ESDS read process is terminated.

Figure 6:
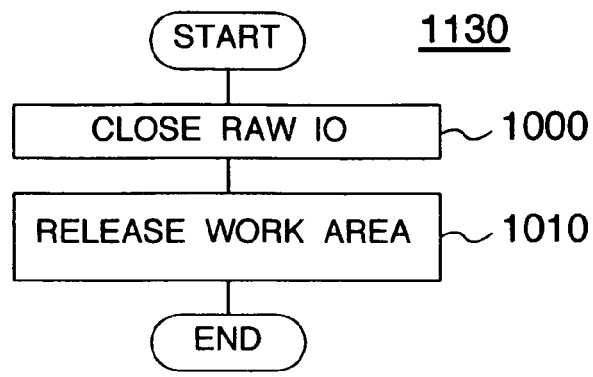
FIG. 6 shows a VSAM CLOSE process in accordance with the first embodiment of the present invention.

FIG. 6 shows a VSAM ESDS close process conducted in the step 1130 by the VSAM access library 30. In a step 1000, the VSAM access library 30 closes the raw IO feature of the UNIX operating system 40. More precisely, it closes the character special file corresponding to the disk subsystem 80. In a step 1010, a work area is released and the process is terminated.

Figure 7:
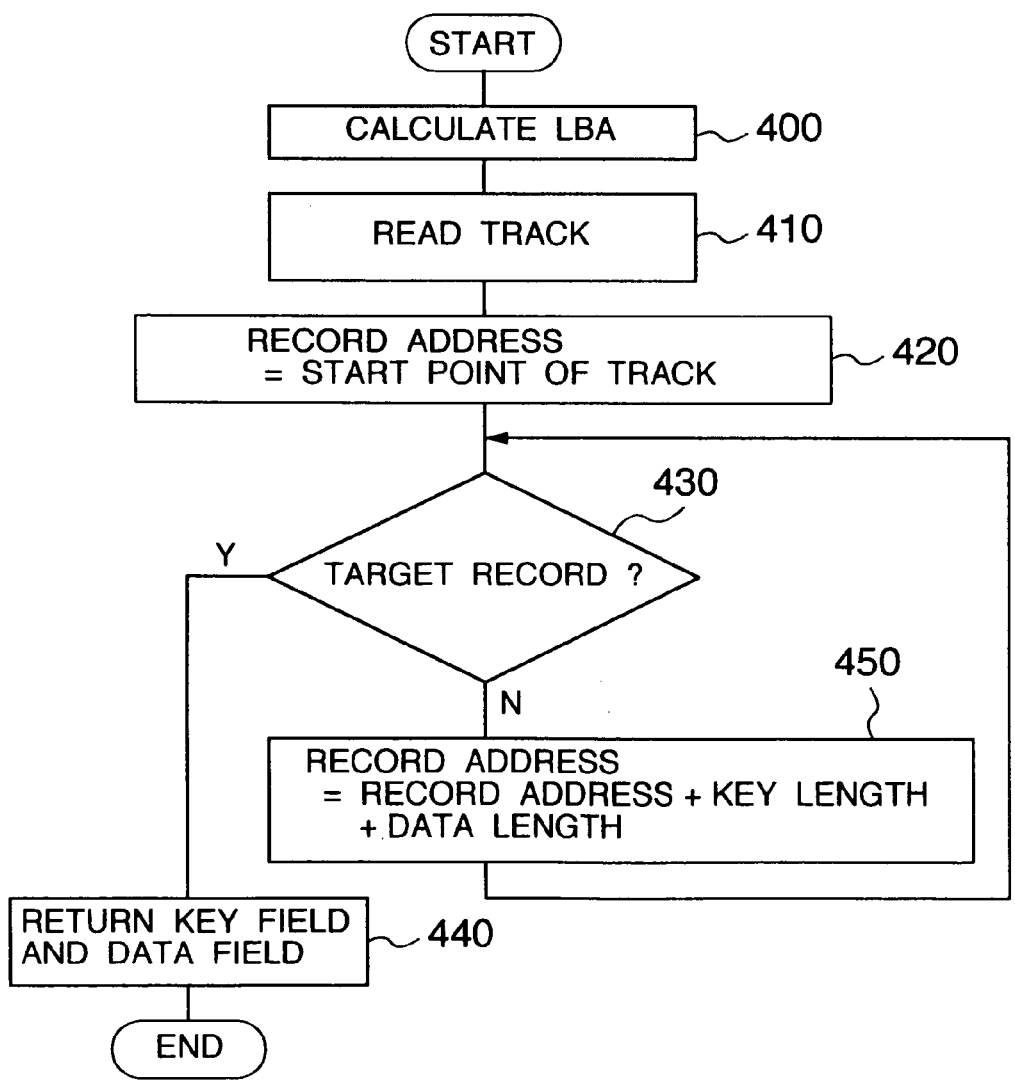
FIG. 7 shows a flow chart of the CKD record read process in accordance with the first embodiment of the present invention.

FIG. 7 shows a flow chart of the CKD record read process conducted by the CKD record access library 35. The CKD record read process is called from the VSAM access library 30 and reads a record having the designated CCHHR from the disk subsystem 80 and returns the key field and the data field thereof to the calling process. In this embodiment, CKD record access library reads all the data on the track including the record having the designed CCHHR. In a step 400, the CKD record access library 35 calculates an LBA corresponding to the top of the track including the record having the designated CCHHR. The LBA is determined by the following formula although only an integer part is handled as a quotient in division. "1" indicates division while "*" indicates multiplication.

$$LBA=(CC* \text{ cylinder capacity}+HH* \text{ track capacity})/ \text{block length (512 bytes)}$$

In a step 410, data from the determined LBA by one track length is read from the disk subsystem 80 through the SCSI interface 60 by using the raw 10 feature of the UNIX operating system. The raw IO feature is used here because the UNIX operating system 40 does not support the access to the VSAM dataset and hence the file management feature of the UNIX operating system 40 cannot be used. In a step 420, a record address to be processed in a step 430 is set to the top of the track. In the step 430, a record ID included in the count field of the record is checked to determine whether the record has the designated CCHHR or not. If it has the designated CCHHR, the process proceeds to a step 440. Otherwise, the process proceeds to a step 450. In the step 440, the key field and the data field of the record are returned to the calling process and the process is terminated. On the other hand, in the step 450, the lengths of the key field and the data field of the current record are added to the record address to set it as a record address to be next processed, and the process returns to the step 430. The lengths of the key field and the data field of the record are described in the count field of the record.

In the process described above, once the CKD record read process is called, one track is always read from the disk subsystem 80. It is possible to cache data of the recently accessed track and when the same track is requested, the cached data is used without accessing the disk subsystem 80.

Figure 8:
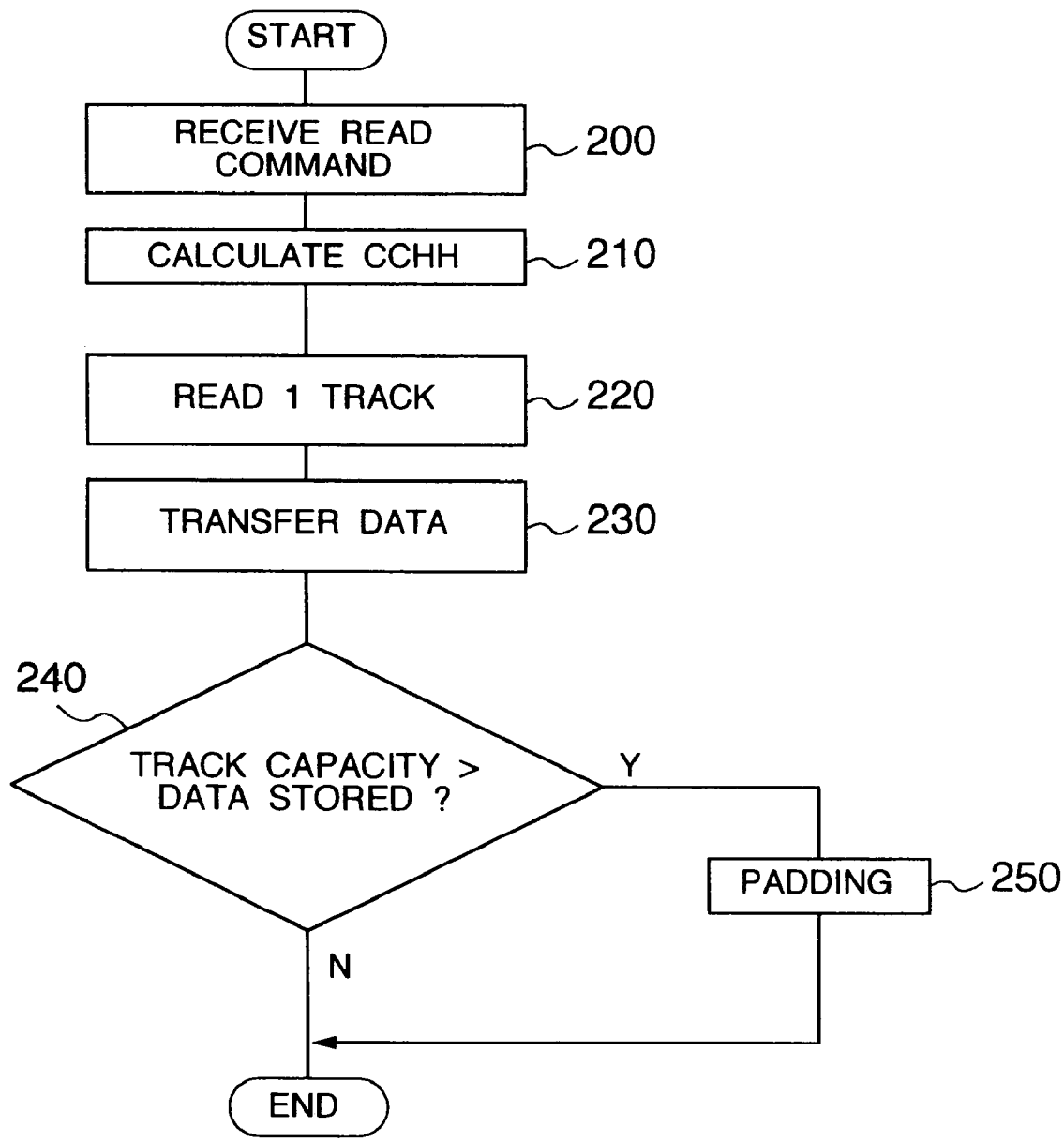
FIG. 8 shows a flow chart of CKD-FBA conversion RIW process A in accordance with the first embodiment of the present invention.

FIG. 8 shows a flow chart of the SCSI READ process conducted by the CKD-FBA record format conversion R/W process A 4000 in the disk subsystem 80. This process is performed by the disk subsystem 80 using the raw IO feature of the UNIX operating system 40 in the CKD record, read step 410 described above. First, in a step 200, the CKD-FBA record format conversion R/W process A 4000 receives a SCSI READ command from the CPU 10 through the SCSI interface 61. In a step 210, an LBA of the target data is acquired from a received CDB (Command Descriptor Block) and it is converted to a cylinder number and a head number of the disk storage in accordance with the following formulas. In the following formulas, "%" represents a residue. Namely, for integers n and m, n % m indicates a residue of the division of n by m.

$$\text{Cylinder number}=(LBA*\text{block length})/\text{cylinder capacity}$$

$$\text{Head number}=((LBA*\text{block length}) \text{ \% cylinder capacity})/\text{track capacity}$$

$$\text{Byte offset from top of track}=(LBA*\text{block length}) \text{ \% track capacity}$$

Figure 9:
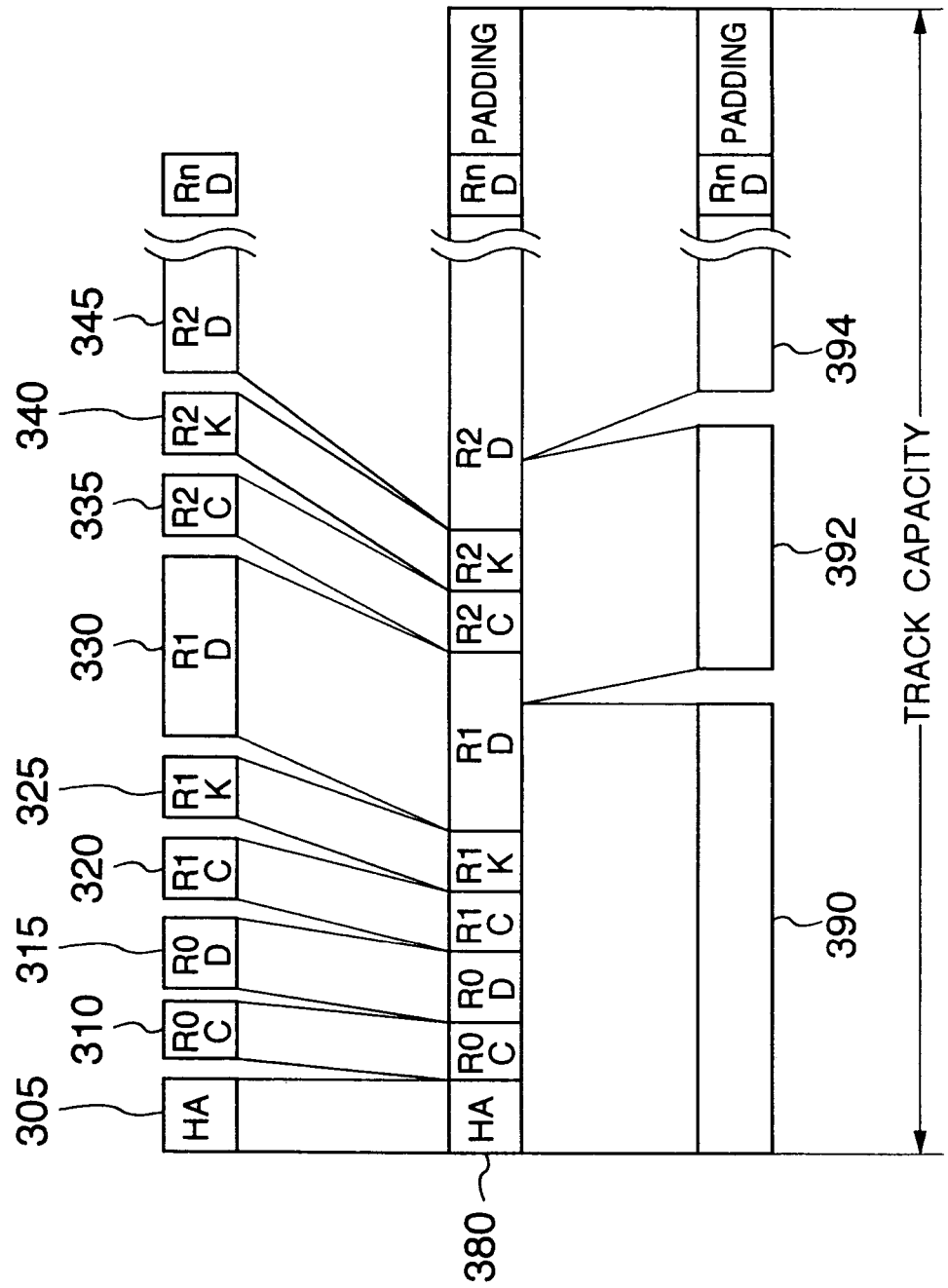
FIG. 9 shows data structure of a track format in accordance with the first embodiment of the present invention.

In a step 220, data of the track having the designated cylinder number and head number is read into the buffer 90. The arrangement (track format) of the data on the track read into the buffer 90 is shown in FIG. 9. In FIG. 9, numerals 300 to 345 indicate the arrangement of actual physical data on the track. On the other hand, numeral 380 indicates a track format read into the buffer 90 in the step 220. Formats 390, 392 and 394 indicate formats when the data indicated by 380 is transferred to the CPU 10 through the SCSI interface 61. Data 305 is a home address and indicates a track status and an ID. Data 310 denotes a count field of the record and data 315 denotes a data field of the record. The count field is a first field in each record and stores information indicating a status of the record, a location and a length. Record 0 is the first record of the track and cannot store user data. Data 320, 325 and 330 denote count field, key field and data field of the record 1, respectively. Data 335, 340 and 345 denote count field, key field and data field of the record 2, respectively. The subsequent records also have the same format as those of the record 1 and the record 2. In each field between the data 305 and 345, there is provided an area which is called a gap and has a predetermined length and in which no data is stored. A track format of data 380 is continuous arrangement. In actual, ECCs (Error Correction Codes) included in the respective field between 305 and 345 are not included in the track format on the buffer 90 but a difference thereof is not represented in FIG. 9 for simplicity. Blocks 390, 392 and 394 are data blocks each having 512-byte length. Data shown in the track format 380 on the buffer 90 are partitioned by 512 bytes and sequentially stored in the data blocks 390, 392 and 394. A boundary of the CKD records does not necessarily correspond to a boundary of blocks. As shown in FIG. 9, the SCSI interface 61 cannot see the ECC and the gap. The track capacity which represents the buffer length is not a maximum of the user data stored in the track but a maximum having the count fields, the home addresses and the length of the record 0 added thereto.

Returning to FIG. 8, in a step 230, the disk subsystem 80 transfers data to the CPU 10 from the block designated by the byte offset from the top of the track of the buffer 90 acquired in the step 210, through the SCSI interface 61. In a step 240, whether the track capacity is larger than the amount of data actually stored in the track or not is determined. And, if the track capacity is larger, the process proceeds to a step 250. Otherwise, that is, the track is 100% full, the read process is terminated. In a step 250, 0 is transferred to the end of the data' block which is currently transferred. It is hereafter referred to as padding. In the CKD format, the capacity of data which can be stored in the track varies with the record length. Thus, generally, the capacity of data actually stored in the track is not necessarily a multiple of the block length (512 bytes in the present example). Without the padding, data of different tracks may be included in one block when the disk is read in the FBA format. This makes the processing of the CKD record access library 35 of the CPU 10 complicated. In the present embodiment, the start of the track from the boundary of blocks is assured by the padding in the step 250. Data other than 0 may be used as the data to be transferred for the padding.

(2) Second Embodiment

Figure 10:
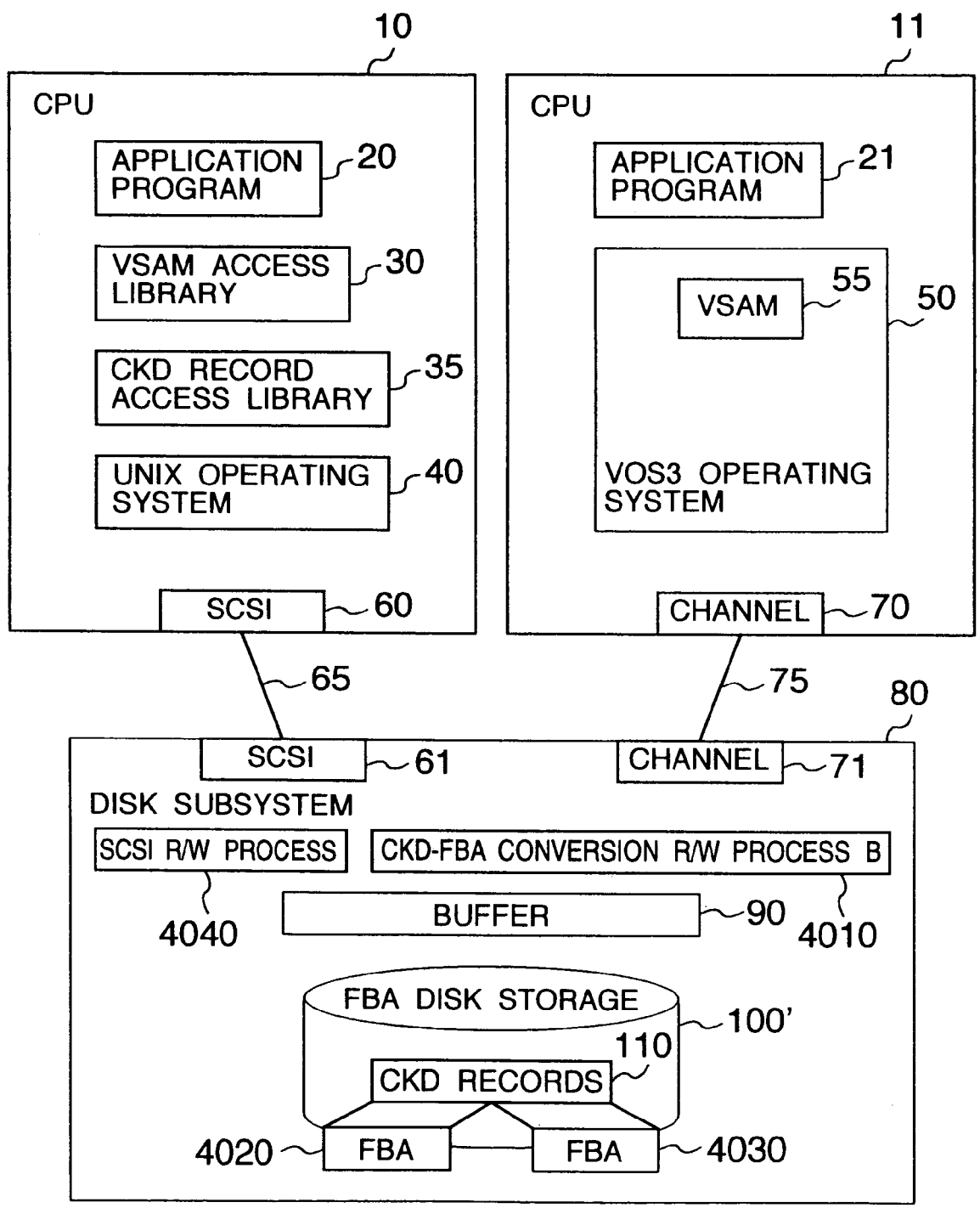
FIG. 10 shows a configuration of a main portion of a computer system in accordance with a second embodiment of the present invention.

FIG. 10 shows a configuration of a main portion of a computer system in accordance with another embodiment of the present invention. In the present embodiment, the computer system is configured by modifying the CKD disk storage 100 owned by the disk subsystem 80 in the first embodiment to a FEA disk storage 100' accessed in the FBA format, and modifying the CKD-FBA record format conversion R/W process A 4000 in the first embodiment to another CKD-FBA record format conversion R/W process B 4010. CKD-FBA record format conversion R/W process B 4010 accepts a CKD record through the channel interface 71, calculates the LBA where the record will be stored, divides the CKD record into several pieces to form the FBA records, converts the record format CKD to FBA and eventually stores the FBA records, and vice versa. The SCSI R/W process 4040 executes read/write requests issued by CPU 10 by way of SCSI interface 61. Like in the first embodiment, a plurality of FBA disk storages 100' may be provided. When a plurality of disk storages are provided, the FBA disk storage 100' shown in FIG. 10 may be replaced by two disk storages each having one-half capacity of that of the FBA disk storage 100' and data having even track numbers designated by the count-key-data format may be stored in one of the disk storages while data having odd track numbers may be stored in the other disk storage.

The FBA disk storage 100' has a 512-byte block length and provides the access by the FBA. The FBA disk storage 100' contains FBA records and the CKD record 110 is actually stored in FBA records 4020 and 4030. The CKD record 110 is stored in the FBA records on the FBA disk storage 100' and the access in accordance with the CKD format is provided to the CPU 11 through the channel interface as they are in the first embodiment.

Figure 11:
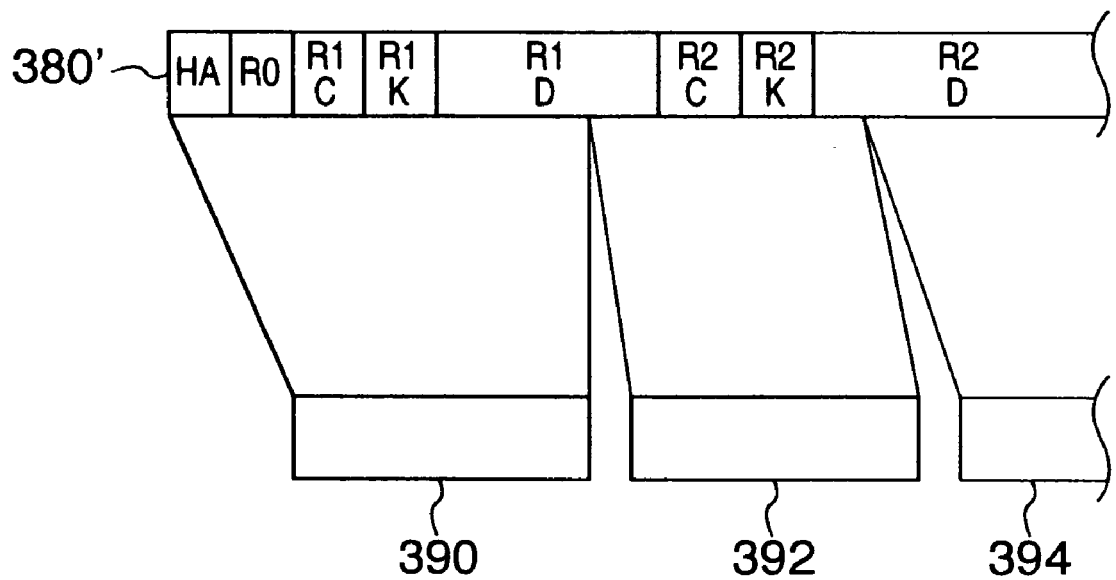
FIG. 11 shows a data structure of a trick format in accordance with the second embodiment of the present invention.

FIG. 11 shows the arrangement of data handled in the present embodiment. A track format 380' is one which is red into the buffer 90. Blocks 390, 392 and 394 indicate data blocks when the data of the track format 380' read into the buffer 90 is transferred to the CPU 10 through the SCSI interface 61. Data blocks 390, 392 and 394 are identical to the data blocks in the first embodiment shown in FIG. 9. The track format 380' includes a home address in the CKD format and-the record 0. This is because the disk subsystem 80 is required to process as so called format write command which is unique to the CKD format and hold the written data in order to be accessed in accordance with the CXD format through the channel interface 71. Examples of the format write command are WRITE HOME ADDRESS and WRITE COUNT, KEY AND DATA.

Figure 22:
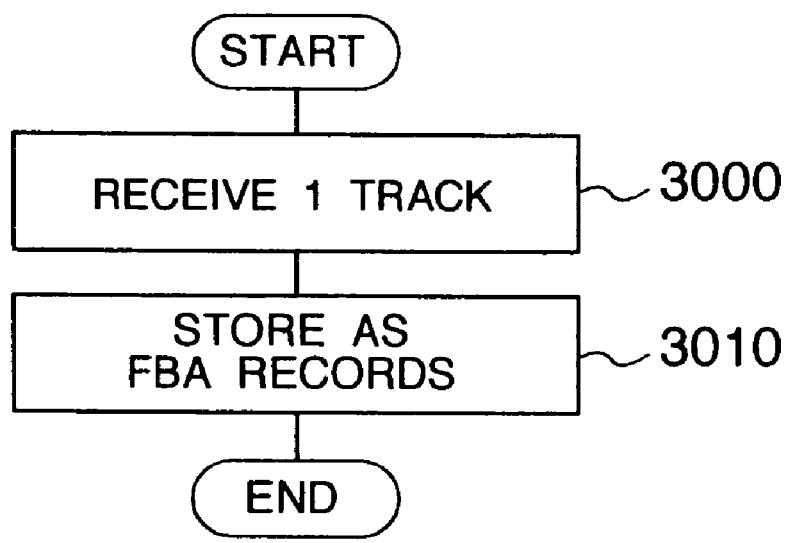
FIG. 22 shows a flow chart of a WRITE TRACK process in accordance with the second embodiment of the present invention.

FIG. 22 shows a flow chart of a WRITE TRACK process which is conducted when CKD-FBA record format conversion R/W process B 4010 receives one track of data through the channel interface 71 from CPU 11.

In a step 3000, CKD-FBA record format conversion R/W process B 4010 receives one track of data through the channel interface 71 from CPU 11 and converts the data in the buffer 90 into the track format 380' as shown in FIG. 11.

The track format 380' consists of home address, record 0, record 1, records following record 1 and optional padding data. The length of the track format 380' is predetermined and is a multiple of block length specified in the SCSI specification, in the present example, 512 bytes. And track format 380' contains optional padding data after the last record on the track. The track format 380' is equivalent to the track format 380 used in the first embodiment when the CKD-FBA record format conversion R/W process A 4000 reads one track of data from the CKD disk storage 100 into the buffer 90.

In a step 3010, CKD-FBA record format conversion R/W process B 4010 divides the data stored-in the buffer 90 in the track format 380' into 512 byte-sized blocks, and stores the blocks in the FBA disk storage 100'. The format of the data stream generated in the present step is equivalent to the format of the data stream generated in the first embodiment when the CKD-FBA record format conversion R/W process A 4000 transfers data between CPU 10 and the disk subsystem 80 through the SCSI interface 61.

Figure 12:
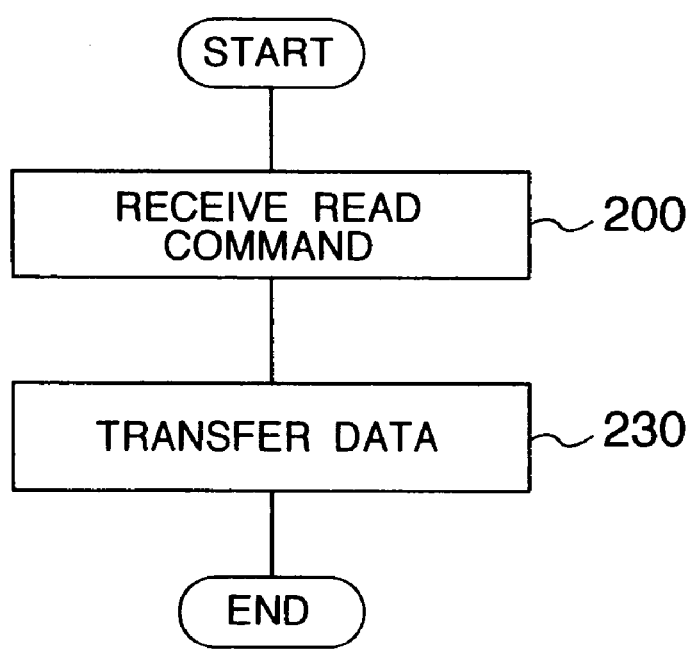
FIG. 12 shows a flow chart of SCSI RIW process in accordance with the second embodiment of the present invention.

FIG. 12 shows a flow chart of a SCSI READ process which is conducted by the SCSI R/W process 4040 in the disk subsystem 80 when the CPU 10 issues a SCSI READ command to the disk subsystem 80. In the present example, the process shown in the FIG. 12 is conducted as a result of the request issued by the CKD record access library 35 in the CPU 10. In the present embodiment, the FBA disk storage 100' contains the data stream whose format is equivalent to the format of the data transferred between the CPU 10 and the disk subsystem 80 as described in the first embodiment.

So, SCSI R/W process 4040 merely starts the transfer of blocks from the location in the FBA disk storage 100' which corresponds to the LBA designated by the SCSI READ command. And when as many as blocks designated by the SCSI READ command are transferred, the SCSI READ process is terminated.

Figure 18:
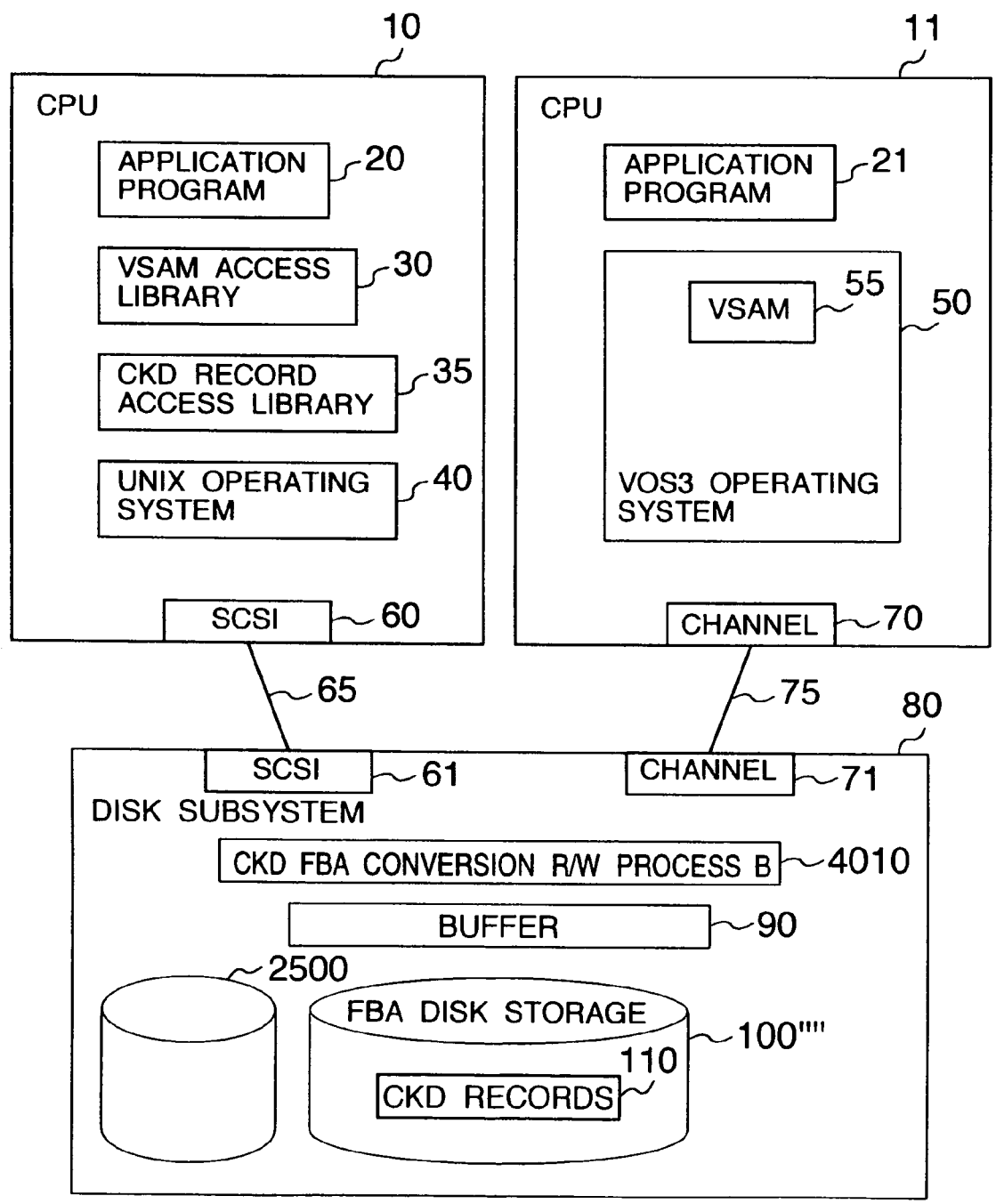
FIG. 18 shows a configuration of a computer system in accordance with embodiment of the present invention.

FIG. 18 shows a configuration of a main portion of a computer system in which the FBA disk storage 100' of the computer system of the second embodiment of the present invention is replaced by a disk storage 100' and a disk storage 2500 each having one-half capacity. The distribution of data to each disk storage is conducted by track unit, and the data having even track numbers are stored in the disk storage 2500 while the data having odd track numbers are stored in the CKD disk storage 100'"

(3) Third Embodiment

Figure 13:
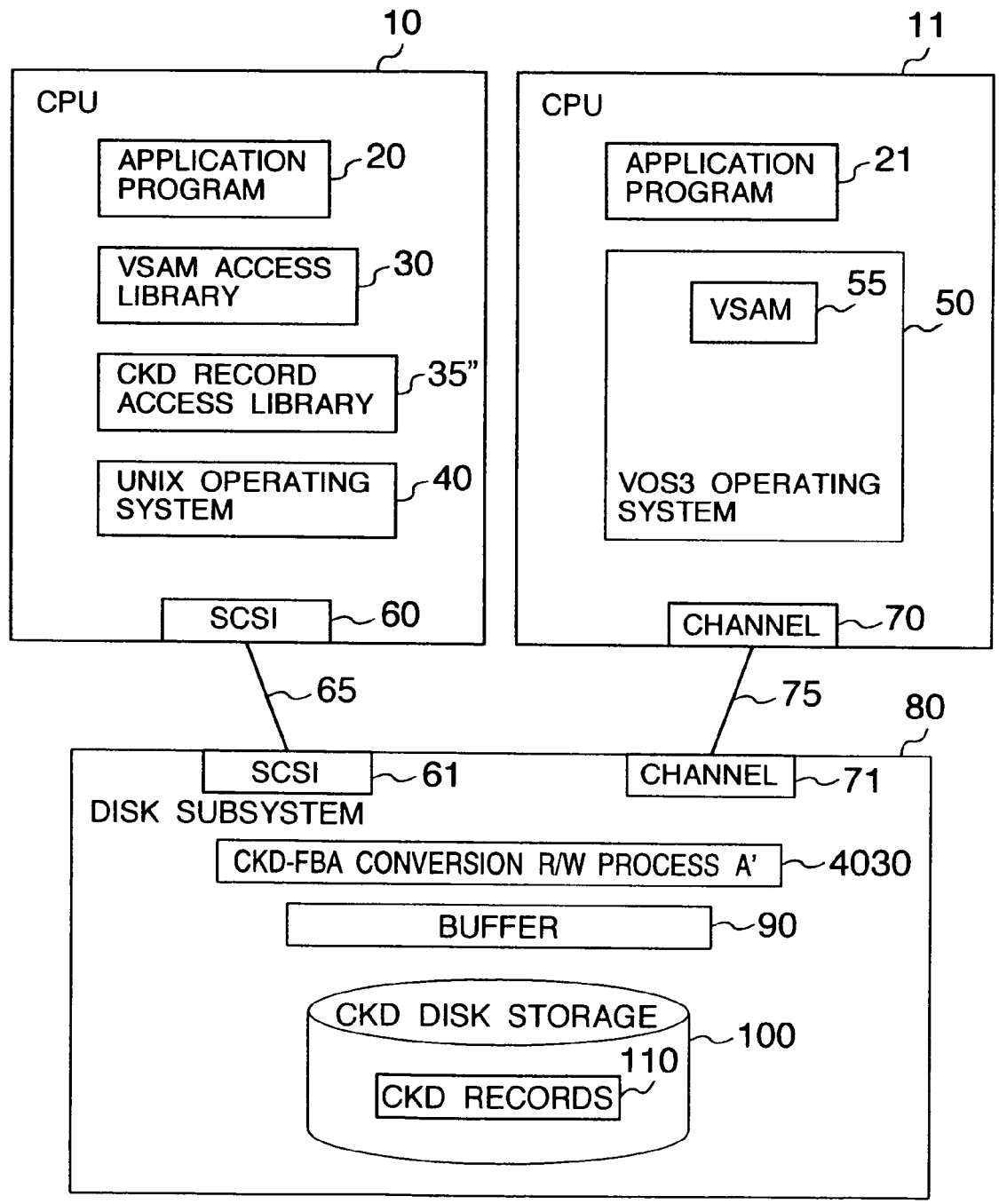
FIG. 13 shows a configuration of a main portion of a computer system in accordance with a third embodiment of the present invention.

FIG. 13 shows a configuration of a main portion of a computer system in accordance with a third embodiment of the present invention. Basically, the computer system of the present embodiment is configured in the same manner as the computer system in the first embodiment but it differs in the following points. Namely, in the first embodiment, the CKD record access library of the CPU 10 delivers to the application program the data excluding the count field from the CKD record, but in the present embodiment, the disk subsystem 80 conducts that process. Accordingly, in the present embodiment, the process in the CKD record access library 35" is different from that of the CKD record access library of the first embodiment. The CKD record access library 35" reads from the disk control unit 80 the data excluding the count field, block by block.

Moreover, CKD-FBA record format conversion R/W process A' 4030 is also a little different from the CKD-FBA record format conversion R/W process A 4000 in the first embodiment.

Figure 23:
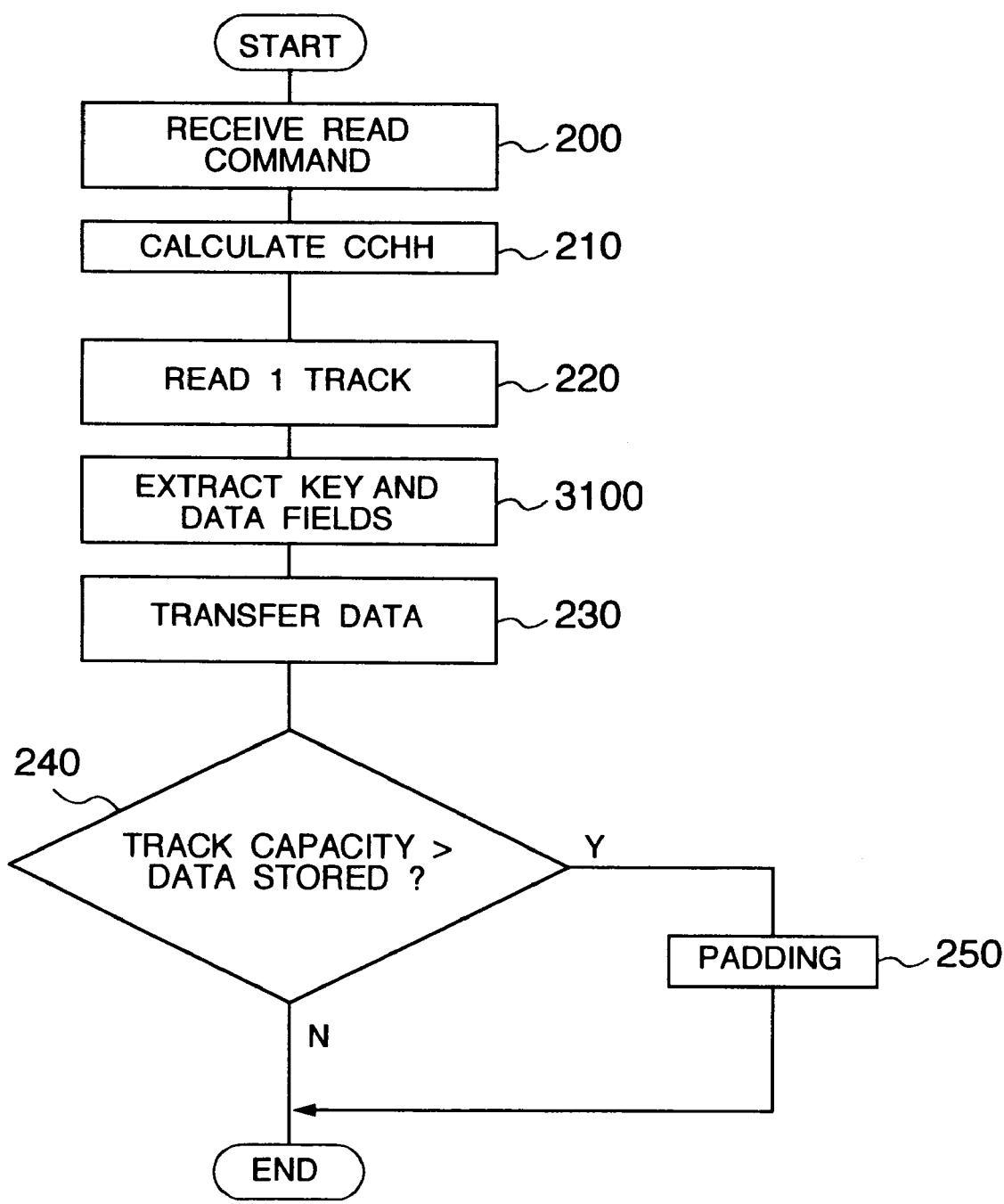
FIG. 23 shows a flow chart of a SCSI READ process in accordance with the third embodiment of the present invention.

FIG. 23 shows a flow chart of a SCSI READ process which is conducted by the CKD-FBA record format conversion R/W process A' 4030 in the disk subsystem 80 when the CPU 10 issues a SCSI READ command to the disk subsystem 80. The different point from the flow chart of the SCSI READ process which is conducted by the CKD-FBA record format conversion R/W process A 4000 is that in step 3100, CKD-FBA record format conversion R/W process A' 4030 extracts key and data fields from CKD records read in the buffer 90, and transfers only these data to the CPU 10 through SCSI interface 61.

Other steps in the SCSI READ process are identical to those described in the first embodiment and the explanation thereof is omitted.

In the present embodiment, the data which the CKD record access library, 35 receives through the SCSI interface 60 does not include the count field. Thus, the CKD record access library 35" cannot determine the record boundary by only the received data. However, this does not cause a problem in accessing the VSAM by the following reason. Usually, in the VSAM, the physical data stored in the disk storage does not correspond to the VSAM record handled by the application program which is the user. The allocation of the CKD record when storing in the disk storage is conducted for each CI. Each CKD record which stores the CI does not have a key field and all data field lengths are appropriately determined by the VSAM to the same length so long as the CKD records belong to the same VSAM dataset. As described above, the disk subsystem 80 assures that the track boundary in the CKD format does not cross the block boundary in the FBA format when the data stored in the CKD format is accessed in the FBA format, by conducting the padding in the step 250. Thus, if the track start point is given, the target position can be readily determined from the record number and the record length.

Further, the lack of the count field in the data received by the CKD record access library 35 does not cause a problem in accessing the VTOC. The VTOC is a set of records of the 44-byte key field and the 96-byte data field. Thus, the determination of the record position is easy as it is for the VSAM.

Accordingly, the CKD record access library 35 can find the record boundary when it is taught the type of record stored in the track currently handled, from the VSAM access library 30. It should be noted that some of the access methods other than the VSAM method which handle the CKD records of any length may not fit to the method of the present embodiment.

Figure 14:
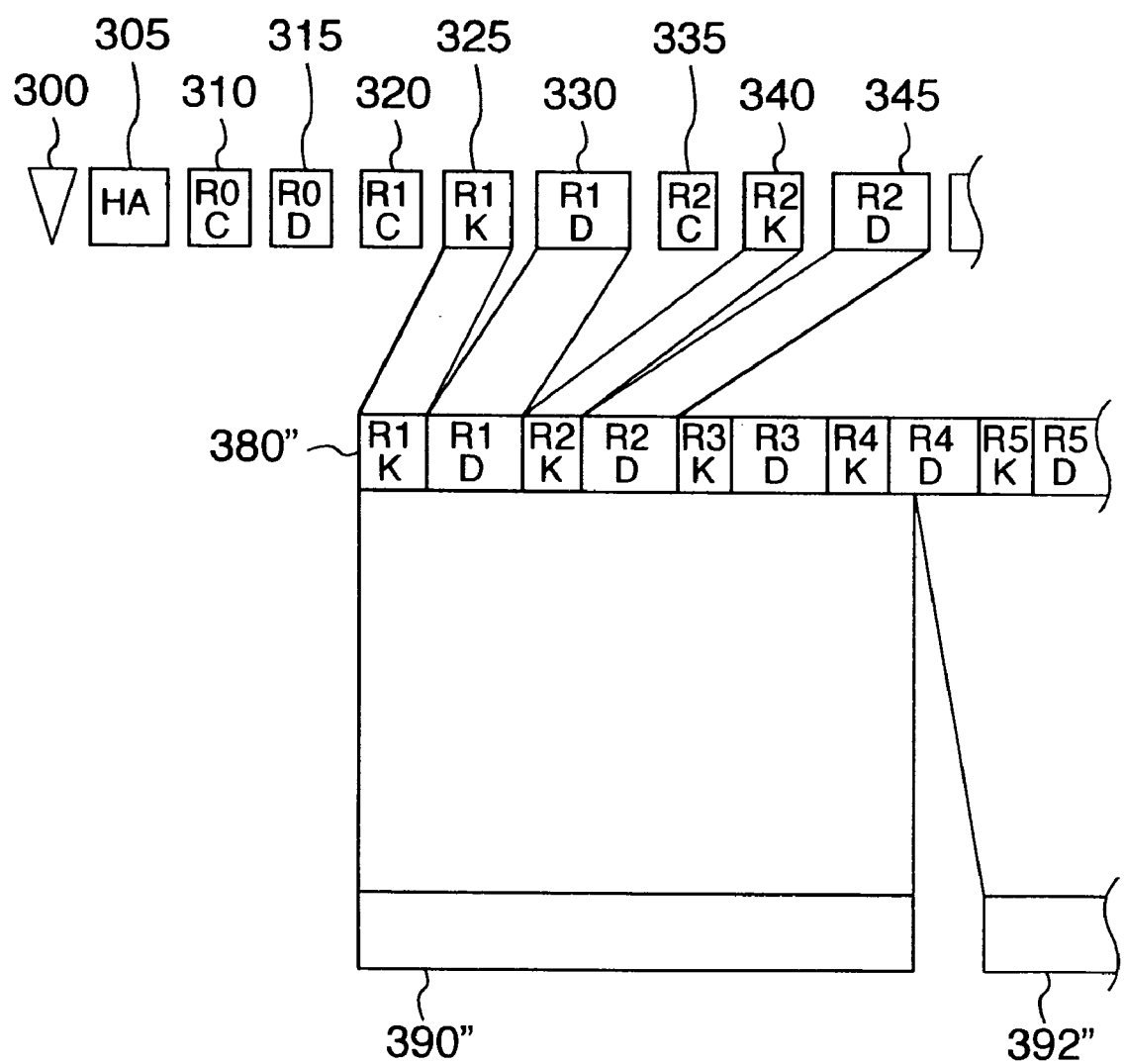
FIG. 14 shows a data structure of a track format in accordance with the third embodiment of the present invention.

FIG. 14 shows a data arrangement in the present embodiment. Numerals 300 to 345 denote fields on a track of the CKD disk storage 100 and show the data arrangement on an actual physical track. Numeral 380" shows a track format read into the buffer 90. Numerals 390" and 392" denote data blocks when the data in the track format 380" on the buffer 90 is transferred to the CPU 10 through the SCSI interface 61. In the present embodiment, the data read into the buffer 90 is the set of the record fields and the, data fields of only those records which are subsequent to the record 1 among the fields 305 to 345 on the CKD disk storage 100.

Figure 15:
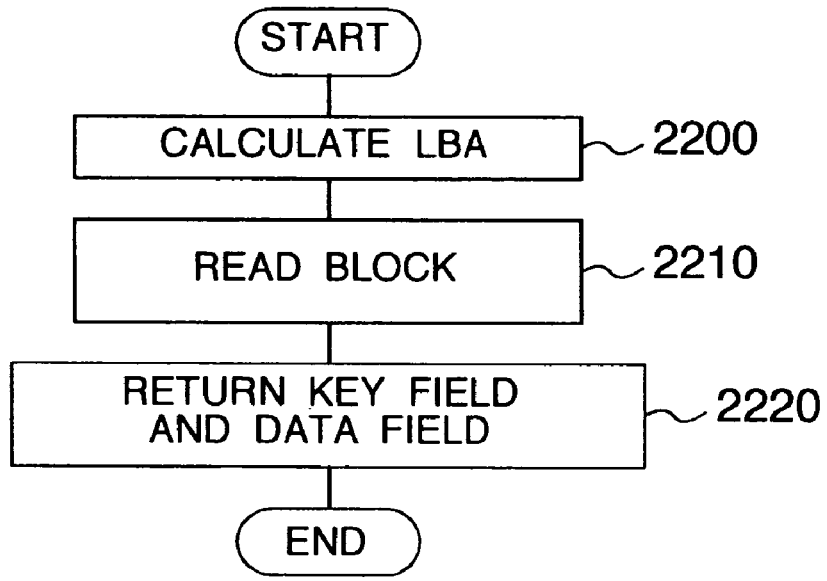
FIG. 15 shows a flow chart of a CKD record read process in accordance with the third embodiment of the present invention.

FIG. 15 shows a flow chart of a CKD record read process which is executed by the CKD record access library 35". In the CKD record read process in the present embodiment, in a step 2200, the LBA of the block including the record having the CCHHR designated by the application program 20 is calculated by the following formula, where R is a record number of a target record.

$$LBA = (CC*\text{cylinder capacity} + HH*\text{track capacity})/\text{block length} + ((R-*\text{record length})/\text{block length}$$

The first term is a start address of the track including the target record and the second term is an offset on the track. A start offset of the target record in the block is given by:

$$\text{Interblock offset} = ((R-1)*\text{record length}) \% \text{block length}$$

In a step 2210, the data is read from the disk subsystem 80 through the SCSI interface 60, by only the ((record length+(block length −1))/block length) blocks of the determined LBA, or when the record extends across the blocks, one more block additionally, by using the raw IO feature of the UNIX operating system 40. In a step 2220, (address of the read data+interblock offset) is returned to the requesting process as a key field, and the end address of the key field is returned as a data field, and the process is terminated.

Referring to FIG. 14, a specific example of the CKD record read process is explained.

It is assumed that the CKD record library 35" receives a request to read the record 4 of the VTOC from the VSAM access library 30. It is also assumed that the VTOC starts from the record 1 at the beginning of the track and the record length is 140-byte length with a key field being 44-byte length and a data field being 96-byte length. It is further assumed that the block length is 512-byte length. In this case;

$$LBA = (CC*\text{cylinder capacity} + HH*\text{track capacity})/512 + ((4-1)*140)/512 \text{ Interblock offset} = ((4-1)*140) \% 512 = 420$$

First, in a step 2210, (140+(512−1))/512+1=2 blocks are read. Then, in a step 2220, the address at the 420th byte from the top of the read data is returned to the VSAM access library 30 as a key field and the address at the 464th byte is returned as a data field.

(4) Fourth Embodiment

Figure 16:
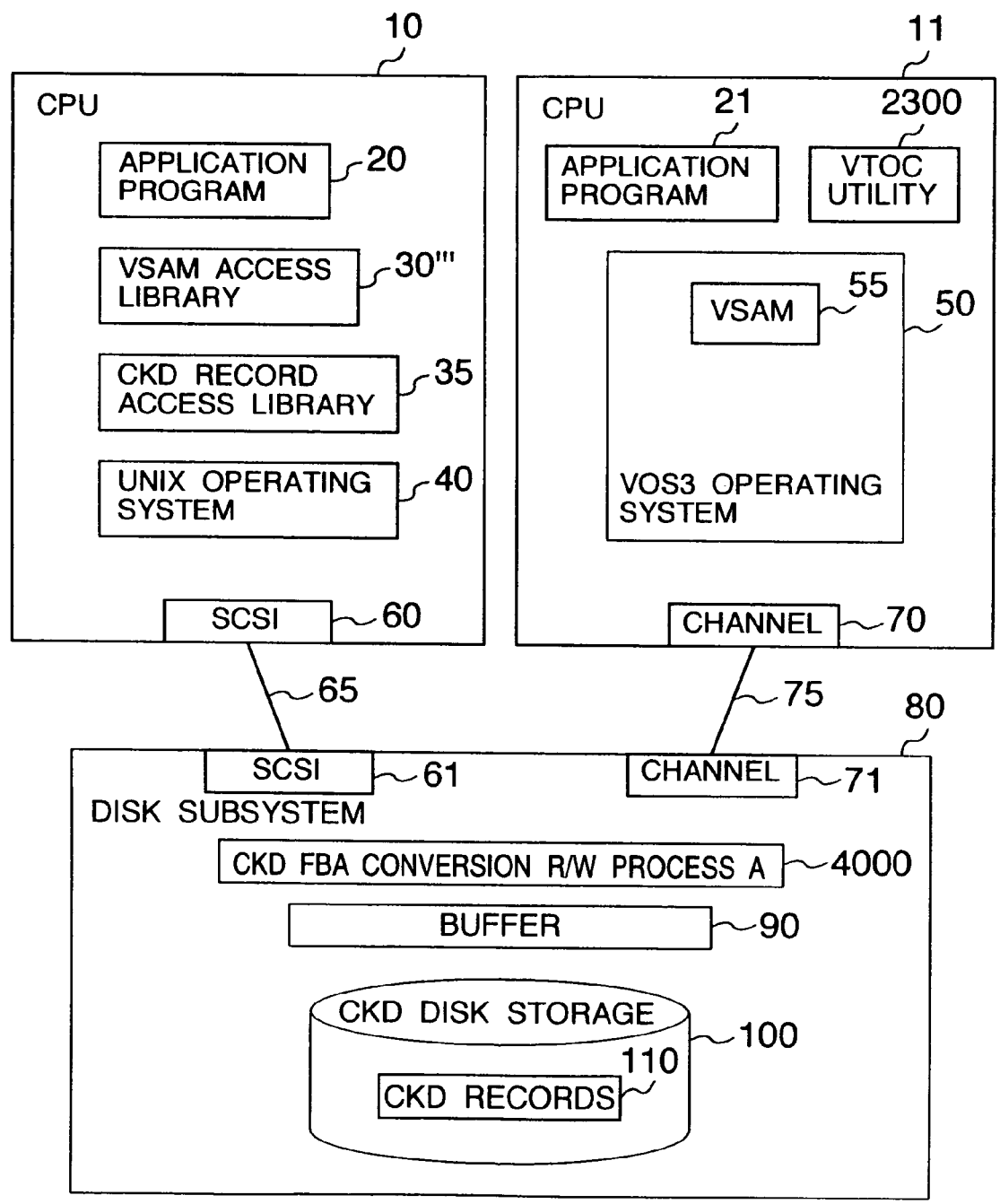
FIG. 16 shows a configuration of a computer system in accordance with a fourth embodiment of the present invention.

FIG. 16 shows a configuration of a main portion of a computer system in accordance with a fourth embodiment of the present invention. The computer system of the present embodiment differs from the first embodiment in that the CPU 11 is provided with a VTOC utility 2300 and the VSAM access library 30''' of the CPU 10 utilizes the VTOC utility 2300 to conduct the VSAM OPEN process. The differences from the first embodiment are now explained. In the first embodiment, the VSAM access library 30 reads the standard volume label stored in the disk storage and the VTOC to seek the format 1 DSCB of the designated dataset name in the VSAM OPEN process, but the VSAM access library 30''' of the present embodiment uses the data acquired by the VTOC utility 2300 and does not access the disk subsystem 80 in order to acquire the data stored in VTOC. The VTOC utility 2300 runs on the VOS3 operating system 50 and accesses the disk subsystem 80 to acquire the format 1 DSCB of the target dataset. In order to achieve it, the VOS3 operating system 50 is provided with a macro called OBTAIN (SEARCH) macro.

Figure 17:
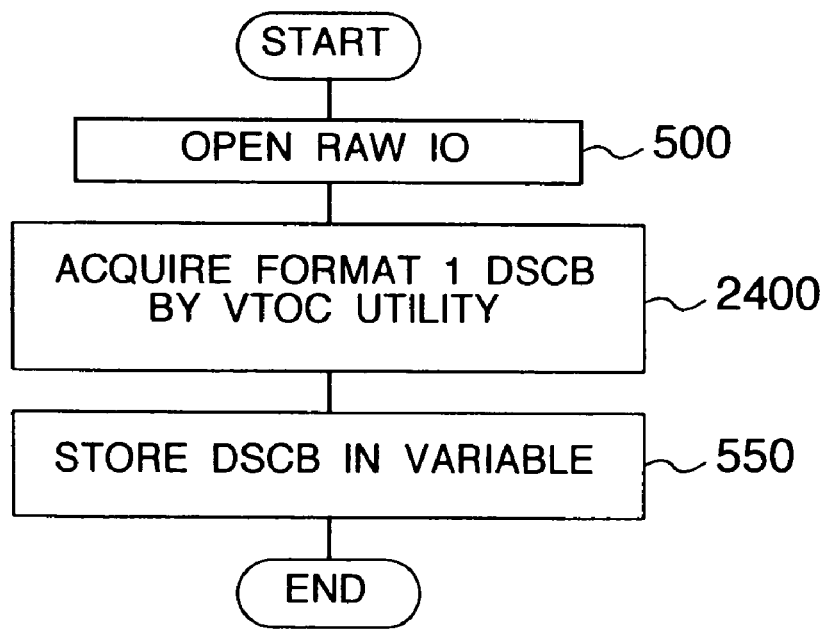
FIG. 17 shows a flow chart of a VSMI OPEN process in accordance with the fourth embodiment of the present invention.

FIG. 17 shows a flow chart of a VSAM ESDS open process conducted by the VSAM access library 30'. In a step 500, the VSAM access library 30' opens the raw IO feature of the UNIX operating system 40. In a step 2400, the VSAM access library 30''' acquires the format 1 DSCB from the VTOC utility 2300. Specifically, it calls the VTOC utility 2300 which is present in the CPU 11 by using interprogram communication. The VTOC utility 2300 issues the OBTAIN (SEARCH) macro to the VOS3 operating system 50 while designating a target dataset name. The VOS3 operating system 50 accesses the VTOC and returns the resulting format 1 DSCB to the VTOC utility 2300. The VTOC utility 2300 returns the result to the VSAM access library 30" on the CPU 10. Alternatively, the VTOC utility 2300 may be previously run and the result thereof may be inputted from the console connected to the CPU 10. In a step 550, the format 1 DSCB is copied to a local variable of the VSAM access library 30''' and the process returns to the requesting process and the VSAM ESDS open process is terminated.

When the VOS3 operating system 50 accesses the VTOC, it uses a VTOC index or uses a CCW (Channel Command Word) for searching a record having a designated key field, and hence the process thereof is generally faster than the process executed in the steps 505 to 540 of the VSAM OPEN process conducted by the VSAM access library 30 in the first embodiment. Accordingly, the present embodiment attains faster data access than the first embodiment.

(5) Fifth Embodiment

Figure 19:
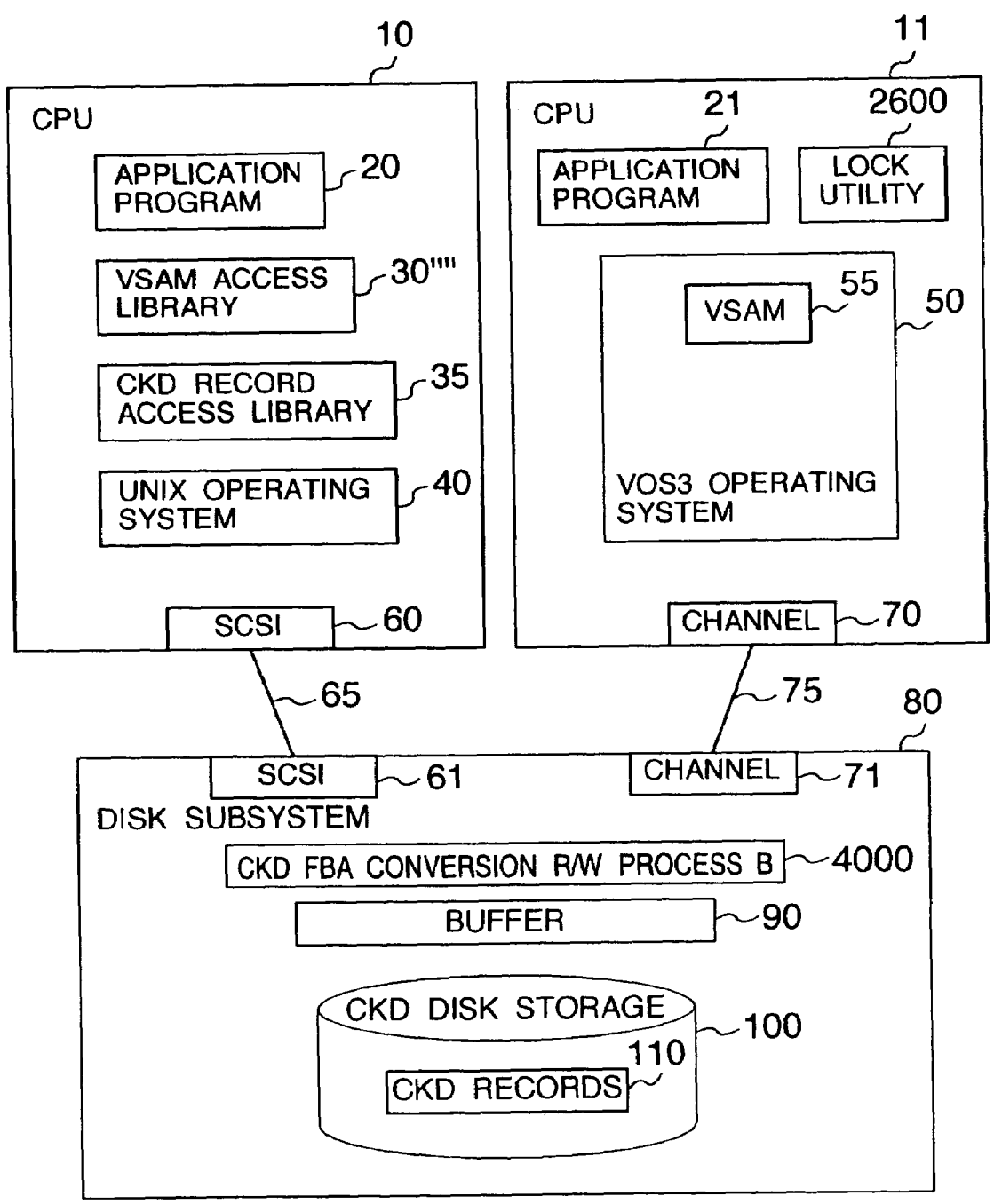
FIG. 19 shows a configuration of a computer system in accordance with a fifth embodiment of the present invention.
Figure 20:
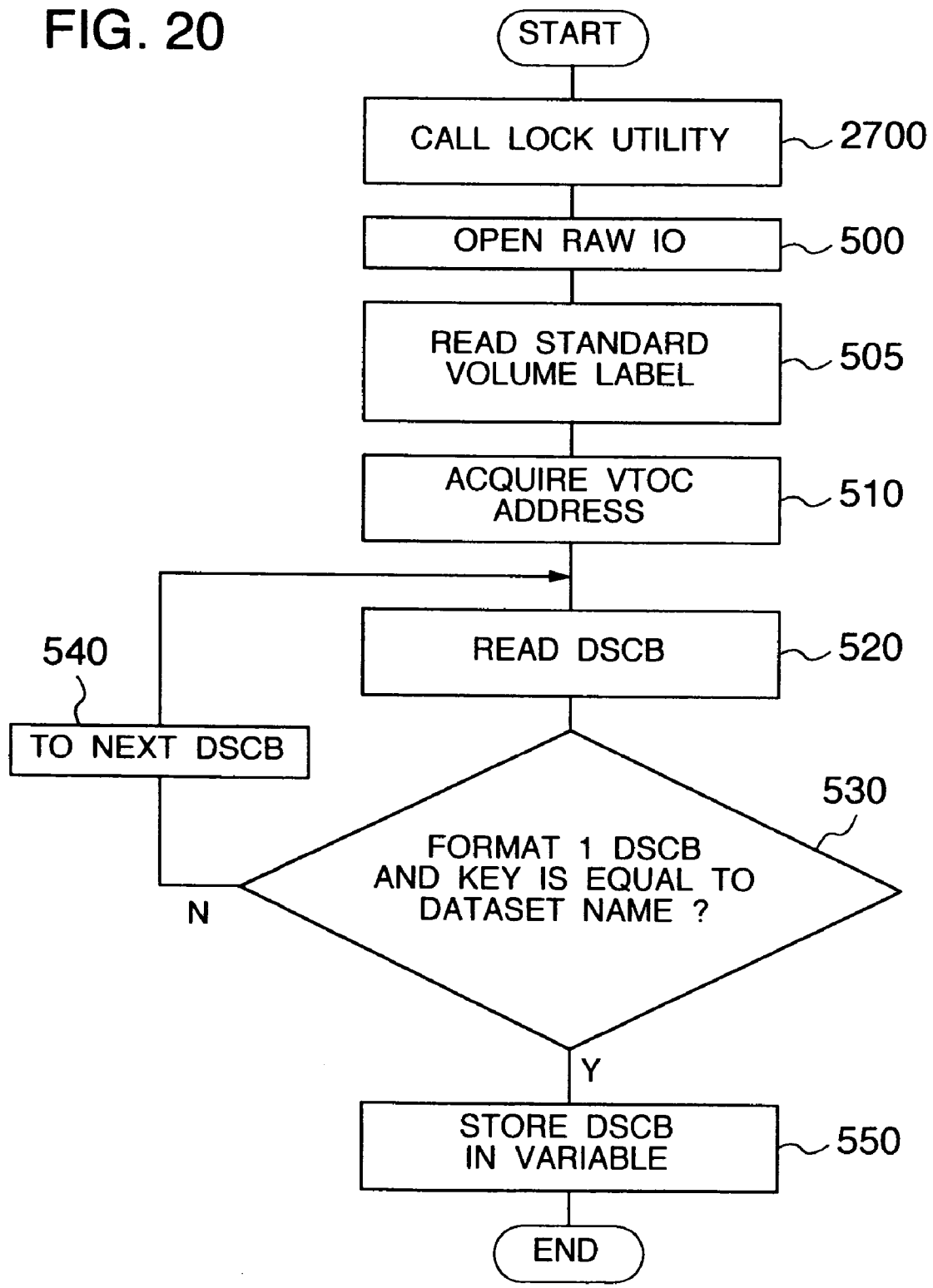
FIG. 20 shows a flow chart of a VSAM OPEN process in accordance with the fifth embodiment of the present invention.

FIG. 19 shows a configuration of a main portion of a computer system in accordance with a fifth embodiment of the present invention.

In the configuration of the computer system of the fifth embodiment of the present invention, the VSAM access library 30 of the first embodiment is replaced by a VSAM access library 30'''' having a somewhat different feature and the CPU 11 is provided with a lock utility 2600. The present embodiment has a configuration to solve the following problems which the first embodiment possesses.

The VOS3 operating system 50 accesses data by an interface compatible to the count-key-data format and manages the data, and the UNIX operating system 40 accesses data by an interface compatible to the fixed length data format and manages the data. Both operating systems have information as to whether the respective datasets in the disk storage are busy or not in the memories managed by the respective operating systems. Thus, each operating system does not know which dataset is used by other. Thus, a problem that the dataset currently referred to by application program 20 running on the UNIX operating system 40 may be deleted by the application program 21 running on the VOS3 operating system 50 cannot be avoided. Such a problem should be avoided because the misoperation of the application program or the operating system or the break of the dataset may be caused.

Thus, in the present embodiment, the lock utility 2600 is provided.

The lock utility 2600 is a program running on the VOS3 operating system 50. The lock utility 2600 requests to the VOS3 operating system 50 the use of the dataset to be accessed by the VSAM access library 30'''' in accordance with the request of the VSAM access library 30''''. However, the lock utility 2600 does not access the dataset for which the use is requested by itself. The access to the dataset is conducted by the UNIX operating system 40 through the SCSI interface. The VOS3 operating system is provided with a macro for requesting the use of the dataset as required and it is called a DYNALLOC macro. When the VSAM access library 30'''' is to access the dataset, it designates the dataset name and calls the lock utility 2600. The lock utility 2600 issues the DYNALLOC macro while designating the target dataset name. Thus, the dataset to be accessed by the UNIX operating system 40 is considered to be busy for the VOS3 operating system and the interference of the access described above is avoided process conducted by the VSAM access library 30''''.

In a step 2700, the VSAM access library 30'''' designates the dataset name to be opened and calls the lock utility 2600. Specifically, it calls the lock utility by using the interprogram communication. The lock utility 2600 issues the DYNALLOC macro to the VOS3 operating system 50 to requests the use of the dataset. Thus, the dataset can no longer be accessed from the application program running on the VOS3 operating system.

The subsequent process is similar to that of FIG. 4 and the explanation thereof is omitted.

Figure 21:
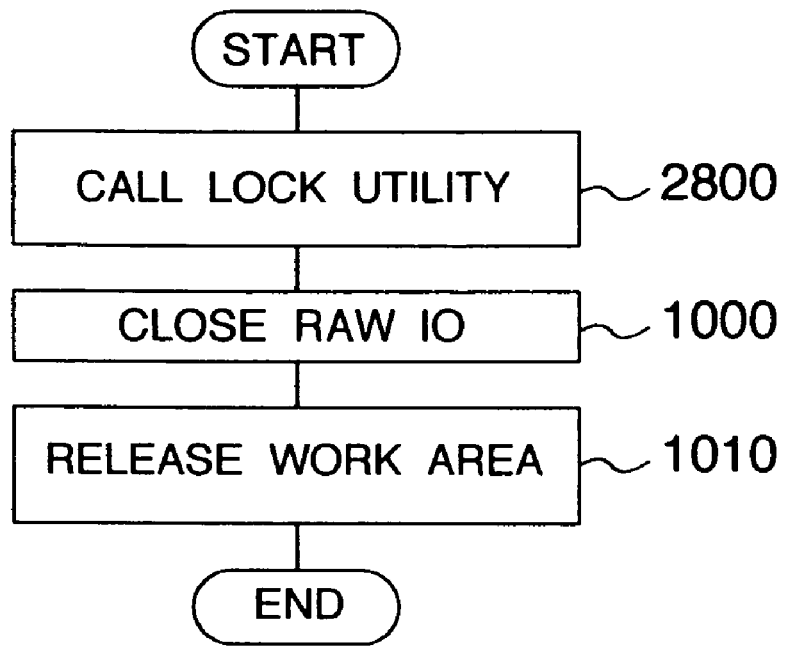
FIG. 21 shows a flow chart of a VSAM CLOSE process in accordance with the present invention.

FIG. 21 shows a flow chart of a VSAM ESDS close process conducted by the VSAM access library 30'

In a step 2800, the VSAM access library 30'''' designates the dataset name to be closed and calls the lock utility 2600. The lock utility 2600 issues the DYNALLOC macro to the VOS3 operating system 50 to convey the termination of the use of the dataset. The dataset is now ready to be accessed from the application program running on the VOS3 operating system 50. The subsequent process is similar to that of FIG. 6 and the explanation thereof is omitted.

In the present embodiment, the dataset opened by the VSAM access library 30'''' can no longer be accessed from the application program running on the VOS3 operating system 50. It is possible to allow the reading of the dataset but does not allow the updating. To this end, the VSAM access library 30'' gives to the lock utility 2600 the dataset name as well as a shared mode of the dataset and the lock utility 2600 issues the DYNALLOC macro in accordance with the shared mode.

While not described in the present embodiment, the VSAM access library 30'' may newly prepare a dataset for managing the VOS3 operating system 50 on the CKD disk storage 100 in accordance with the application program 20 running on the operating system 40 by using the lock utility 2600. Similarly, the dataset may be deleted or the size of the existing dataset may be expanded or reduced.

In accordance with the computer system of the present invention, the data may be shared between the main frame and the open system. Thus, the flexible, low cost and high performance computer' system may be constructed.

What is claimed is:

1. A computer system comprising:
    a first computer which includes an interface according to CKD;
    a second computer which includes an interface according to FBA; and
    a storage system which includes a first interface according to CKD coupled to said interface of said first computer, a storage device for storing data received via said first interface, and a second interface according to FBA coupled to said interface of said second computer,
    wherein said first computer sends location information of data stored in said storage device to said second computer, and said second computer sends a request for said data via said interface of said second computer to said storage system, said request includes said location information received from said first computer.

2. A computer system of claim 1, wherein said storage system sends said data to said second computer via said second interface in response to the received request.

3. A computer system of claim 2, wherein said data is received at said storage system from said first computer, and stored in said storage device.

4. A computer system of claim 1, wherein said interface of said second computer and said second interface are both according to SCSI format.

5. A storage system coupled to an open system computer and a mainframe computer, comprising:
  a CKD interface coupled to said mainframe computer;
  a FBA interface coupled to said open system computer; and
  a disk device storing data received from said mainframe computer,
  wherein said FBA interface receives a request including location information of target data from said open system computer, said location information is sent from said mainframe computer to said open system computer.

6. A storage system according to claim 5, wherein said storage system sends the target data stored in said disk device to said open system computer according to the received request.

7. A storage system according to claim 6, wherein said storage system sends the target data stored in said disk device, said target data is specified by said location informalion included in the received request.

8. A storage system of claim 5, wherein said FBA interface is according to SCSI format.

9. A computer system comprising:
  a mainframe computer;
  an open system computer; and
  a storage system, which is coupled to said mainframe computer and said open system computer, and which comprises a CKD interface coupled to said mainframe computer, a FBA interface coupled to said open system computer, and a storage device storing data received from said mainframe computer,
  wherein location information of data stored in said storage device is also stored in said storage device, and
  wherein said open system computer obtains said location information from said storage device via said FBA interface, converts the obtained location information into location information in FBA, and sends an access request including the converted location information to said storage system via said FBA interface.

* * * * *